(12) United States Patent
Wentink

(10) Patent No.: US 10,582,451 B2
(45) Date of Patent: Mar. 3, 2020

(54) DIRECT LINK WIRELESS DEVICES WITH POWER SAVINGS

(71) Applicant: QUALCOMM Incorporated, San Diego, CA (US)

(72) Inventor: Maarten Menzo Wentink, Nijmegen (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/186,160

(22) Filed: Nov. 9, 2018

(65) Prior Publication Data

US 2019/0082389 A1    Mar. 14, 2019

Related U.S. Application Data

(63) Continuation of application No. 14/880,948, filed on Oct. 12, 2015, now abandoned.

(60) Provisional application No. 62/063,902, filed on Oct. 14, 2014.

(51) Int. Cl.
*H04W 84/12* (2009.01)
*H04W 52/02* (2009.01)
*H04W 8/00* (2009.01)
*H04W 8/18* (2009.01)

(52) U.S. Cl.
CPC ....... *H04W 52/0219* (2013.01); *H04W 8/005* (2013.01); *H04W 52/0216* (2013.01); *H04W 8/18* (2013.01); *Y02D 70/00* (2018.01); *Y02D 70/142* (2018.01); *Y02D 70/144* (2018.01); *Y02D 70/164* (2018.01); *Y02D 70/26* (2018.01)

(58) Field of Classification Search
None
See application file for complete search history.

(56) References Cited

U.S. PATENT DOCUMENTS

| | | | |
|---|---|---|---|
| 2009/0310578 A1 | 12/2009 | Convertino et al. | |
| 2011/0038290 A1 | 2/2011 | Gong et al. | |
| 2011/0069650 A1* | 3/2011 | Singh | H04W 52/0216 370/311 |
| 2012/0127903 A1* | 5/2012 | Estevez | H04W 52/0209 370/311 |
| 2013/0142189 A1* | 6/2013 | Seok | H04W 28/16 370/338 |
| 2013/0303171 A1 | 11/2013 | Jang et al. | |

(Continued)

*Primary Examiner* — Sithu Ko
(74) *Attorney, Agent, or Firm* — Arent Fox, LLP

(57) ABSTRACT

Various aspects of a communication device for supporting wireless communication for a plurality of stations associated with the communication device are provided. The communication device includes a transceiver configured to receive a request for a wakeup schedule to support direct communications between a first one of the stations and a second one of the stations. In an aspect, the wakeup schedule request may be included in a beacon frame or a probe frame. The communication device also includes a processing system coupled to the transceiver and configured to determine the wakeup schedule for the direct communications based at least in part on the request for the wakeup schedule. In an aspect, the processing system may be configured to determine the wakeup schedule based on one or more parameters included in the wakeup schedule request. In an aspect, the wakeup schedule may include one or more wakeup intervals.

20 Claims, 11 Drawing Sheets

(56) References Cited

U.S. PATENT DOCUMENTS

| | | | |
|---|---|---|---|
| 2014/0056248 A1 | 2/2014 | Wang et al. | |
| 2014/0071870 A1* | 3/2014 | Abraham | H04W 52/0206 370/311 |
| 2014/0122650 A1 | 5/2014 | Lim et al. | |
| 2014/0233443 A1* | 8/2014 | Kumar | H04L 12/12 370/311 |
| 2014/0301294 A1* | 10/2014 | Kwon | H04W 76/14 370/329 |
| 2015/0351125 A1* | 12/2015 | Kwon | H04W 74/002 370/336 |
| 2016/0105829 A1 | 4/2016 | Wentink | |
| 2016/0105850 A1 | 4/2016 | Wentink | |

* cited by examiner

DIRECT LINK WIRELESS DEVICES WITH POWER SAVINGS

CROSS-REFERENCE TO RELATED APPLICATIONS

The present Application for patent is a continuation of application Ser. No. 14/880,948 entitled "DIRECT LINK WIRELESS DEVICES WITH POWER SAVINGS," and filed on Oct. 12, 2015, which claims priority to U.S. Provisional Application Ser. No. 62/063,902, entitled, "DIRECT LINK WIRELESS DEVICES WITH POWER SAVINGS," and filed on Oct. 14, 2014, each of which are assigned to the assignee hereof and each of which are hereby expressly incorporated by reference herein in its entirety.

FIELD

The present disclosure relates generally to telecommunications, and specifically to communications channels in wireless devices.

BACKGROUND

The deployment of wireless local area networks (WLANs) in the home, the office, and various public facilities is commonplace today. Such networks typically employ a wireless access point (AP) that connects a number of wireless stations (STAs) in a specific locality (e.g., home, office, public facility, etc.) to another network, such as the Internet or the like.

In some IEEE 802.11-compliant WLAN networks, one or more STAs may set up direct communication channels to transmit data with each other without relaying the data through the AP. One such technology, Tunneled Direct Link Setup (TDLS), allows stations to connect directly to one another after they have joined a WLAN network with no user intervention.

To establish TDLS direct links, a TDLS-capable STA needs to obtain the status and capabilities of other STAs in the WLAN, including whether any of the other STAs are able to support TDLS. STAs usually must send specific discovery frames to each STA in the WLAN to make such determinations, which requires a minimum level of overhead in the process, such as transmission of TDLS discovery messages to STAs that are not TDLS-capable or are not associated with the same AP, which is not necessary.

For TDLS direct links, at least one of the STAs that use the TDLS link can enter a power-saving mode. In the TDLS power save mode, STAs can periodically sleep and wake up at scheduled times. However, there is no coordination between multiple TDLS direct links about individual STA scheduled wakeup times. This can lead to two active TDLS links having overlapping data transmission times while other periods are unused by any TDLS link, causing potential efficiency within the WLAN.

SUMMARY

An aspect of a communication device for supporting wireless communications for a plurality of stations associated with the communication device is disclosed. The communication device includes a transceiver configured to receive a request for a wakeup schedule to support direct communications between a first one of the stations and a second one of the stations. The communication device also includes a processing system coupled to the transceiver and configured to determine the wakeup schedule for the direct communications based at least in part on the request for the wakeup schedule.

An aspect of a method for supporting wireless communications for a plurality of stations associated with an access point is also disclosed. The method includes the access point receiving a request for a wakeup schedule to support direct communications between a first one of the stations and a second one of the stations. The method also includes determining the wakeup schedule for the direct communications based at least in part on the request for the wakeup schedule.

An aspect of a non-transitory computer readable medium storing computer-executable code for supporting wireless communications for a plurality of stations associated with an access point is also disclosed. The non-transitory computer readable medium includes code, when executed by a processor, causes a communication device to receive a request for a wakeup schedule to support direct communications between a first one of the stations and a second one of the stations. The code also causes the communication device to determine the wakeup schedule for the direct communications based at least in part on the request for the wakeup schedule.

It is understood that other aspects of communication devices and methods will become readily apparent to those skilled in the art from the following detailed description, wherein various aspects of communication devices and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of communication devices and methods will now be presented in the detailed description by way of example, and not by way of limitation, with reference to the accompanying drawings, wherein.

DETAILED DESCRIPTION

Figure 1:
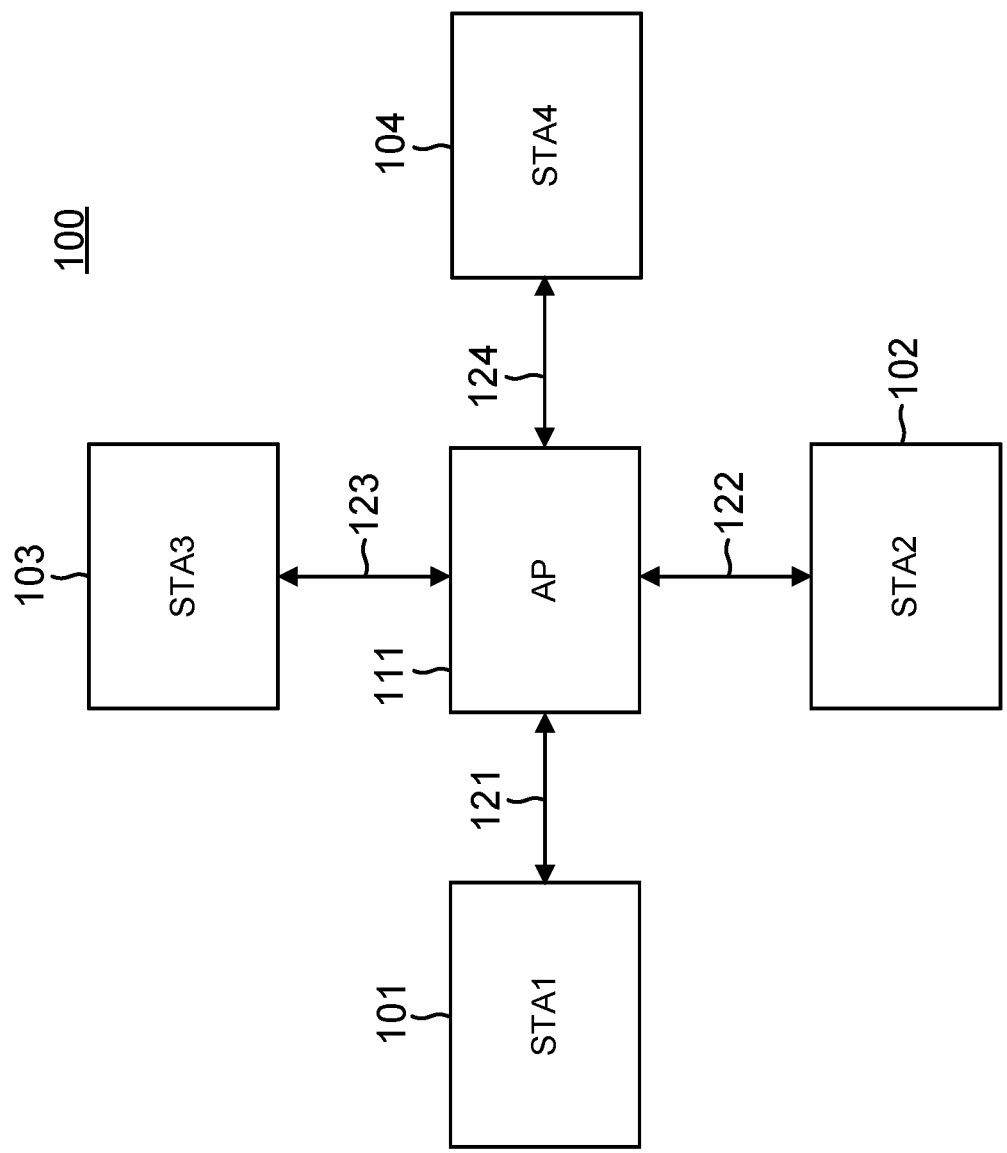
FIG. 1 is a conceptual diagram illustrating an exemplary embodiment of a wireless local area network (WLAN)

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details. In some instances, well known structures and components are shown in block diagram form in order to avoid obscuring the various concepts presented throughout this disclosure.

The word "exemplary" is used herein to mean serving as an example, instance, or illustration. Any embodiment described herein as "exemplary" is not necessarily to be construed as preferred or advantageous over other embodiments. Likewise, the term "embodiment" of a communication device or method does not require that all embodiments of the invention include the described components, structure, features, functionality, processes, advantages, benefits, or modes of operation.

These concepts will now be presented with reference to various communication devices and methods. These communication devices and methods will be described in the following detailed description and illustrated in the accompanying drawings by various elements comprising blocks, modules, components, circuits, steps, processes, algorithms, and the like. These elements, or any portion thereof, either alone or in combinations with other elements and/or functions, may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. A processor may include a general purpose processor, a reduced instruction set computing (RISC) processor, an advanced RISC Machines (ARM) processor, a digital signal processor (DSP), an application specific integrated circuit (ASIC), a field programmable gate array (FPGA), systems on a chip (SOC), a baseband processor, a programmable logic device (PLD), or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on transitory or non-transitory computer-readable medium. A non-transitory computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), static RAM (SRAM), dynamic RAM (DRAM), synchronous dynamic RAM (SDRAM); double date rate RAM (DDRAM), read only memory (ROM), programmable ROM (PROM), erasable PROM (EPROM), electrically erasable PROM (EEPROM), a general register, or any other suitable non-transitory medium for storing software.

The various interconnections within a processing system may be shown as buses or as single signal lines. Each of the buses may alternatively be a single signal line, and each of the single signal lines may alternatively be buses, and a single line or bus might represent any one or more of a myriad of physical or logical mechanisms for communication between elements. Any of the signals provided over various buses described herein may be time-multiplexed with other signals and provided over one or more common buses.

FIG. 1 is a conceptual diagram illustrating an exemplary embodiment of a wireless local area network (WLAN). In the detailed description that follows, the wireless network will be described as a WLAN, such as an IEEE 802.11 network. However, as those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. The various aspects presented throughout this disclosure may be applicable to any suitable wireless network regardless of the coverage range and the wireless access protocols utilized.

The wireless network may support any number of communication devices. A communication device may be any suitable wireless device capable of operating in a wireless environment, such as an access point (AP) or a wireless station (STA) operating in an IEEE 802.11-compliant network. An AP is generally a fixed terminal that provides backhaul services to STAs within its coverage region; however, the AP may be mobile in some applications. An STA, which may be fixed or mobile, utilizes the backhaul services of an AP to connect to a network, such as the Internet. Examples of an STA include, but are not limited to: a cellular phone, a cordless phone, a smart phone, a tablet computer, a laptop computer, a desktop computer, a personal digital assistant (PDA), a personal communication system (PCS) device, a handheld device, a personal information manager (PIM), personal navigation device (PND), a global positioning system (GPS) device, a wireless modem, a wireless communication device, a multimedia device, a video device, an audio device (e.g., an MP3 player), a wireless local loop (WLL) station, a camera, a game console, a wearable computing device (e.g., a smart watch, smart glass, a health or fitness tracker, etc.), an appliance, a sensor, a vehicle communication system, a medical device, a vending machine, a device for the Internet of Things (IoT), or any other suitable wireless communication device requiring the backhaul services of an AP. An STA may also be referred to by those skilled in the art as: a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, user equipment (UE), or some other suitable terminology. An AP may also be referred to as: a base station, a base transceiver station, a radio base station, a radio transceiver, a transceiver function, or any other suitable terminology. The various concepts described throughout this disclosure are intended to apply to all suitable wireless communication device regardless of their specific nomenclature.

Turning to FIG. 1, the WLAN 100 is shown with an AP 111 and a number of wireless STAs 101-104 within the coverage region of the AP 111. Although only four STAs 101-104 are shown in FIG. 1 for simplicity, it is to be understood that the WLAN 100 may include any number of STAs. AP 111 provides backhaul services to STAs 101-104 over a wireless channel over respective wireless links 121-124. The STAs 101-104 gain access to the wireless channel using a carrier sensing protocol. However, as those skilled in the art will appreciate, the various concepts described throughout this disclosure are equally applicable to any suitable communication device regardless of the protocol or standard used.

Each STA 101-104 may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each STA 101-104 can also include one or more software applications or other circuitry to enable a user to transmit, receive, and/or process data through a user interface. For the purpose of this disclosure, the term "data" shall be construed broadly to include voice, text, audio, video, and all other data generated or received by a user. The term "data" does not include information to control the STA, such as, by way of example, the information contained in the beacon frames transmitted by AP 111. The user interface can include a keypad, display, speaker, microphone, joystick, and/or any other combination of user interface components that enable the user to interact with one of the STAs 101-104.

AP 111 can include software applications or other circuitry to enable associated STAs 101-104 to connect to a network via links 121-124. AP 111 can send frames to STAs 101-104 and receive frames from STAs 101-104 to transfer data with STAs 101-104, in addition to sending and/or receiving control information from STAs 101-104.

AP 111 can establish links 121-124 with STAs 101-104 when one of the STAs 101-104 is within a physical local area of AP 111. Links 121-124 can comprise communications channels that can enable both uplink and downlink communications. When connecting to AP 111, an STA such as STA 101 can first authenticate itself with AP 111 and then associate itself with AP 111. Once associated, link 121 can be established between AP 111 and STA 101. Once the link is established, AP 111 can send management frames and data frames through the direct communications channel. Similarly, STAs 102-104 can establish communications channels with AP 111 by establishing direct links 122-124, respectively.

Figure 2:
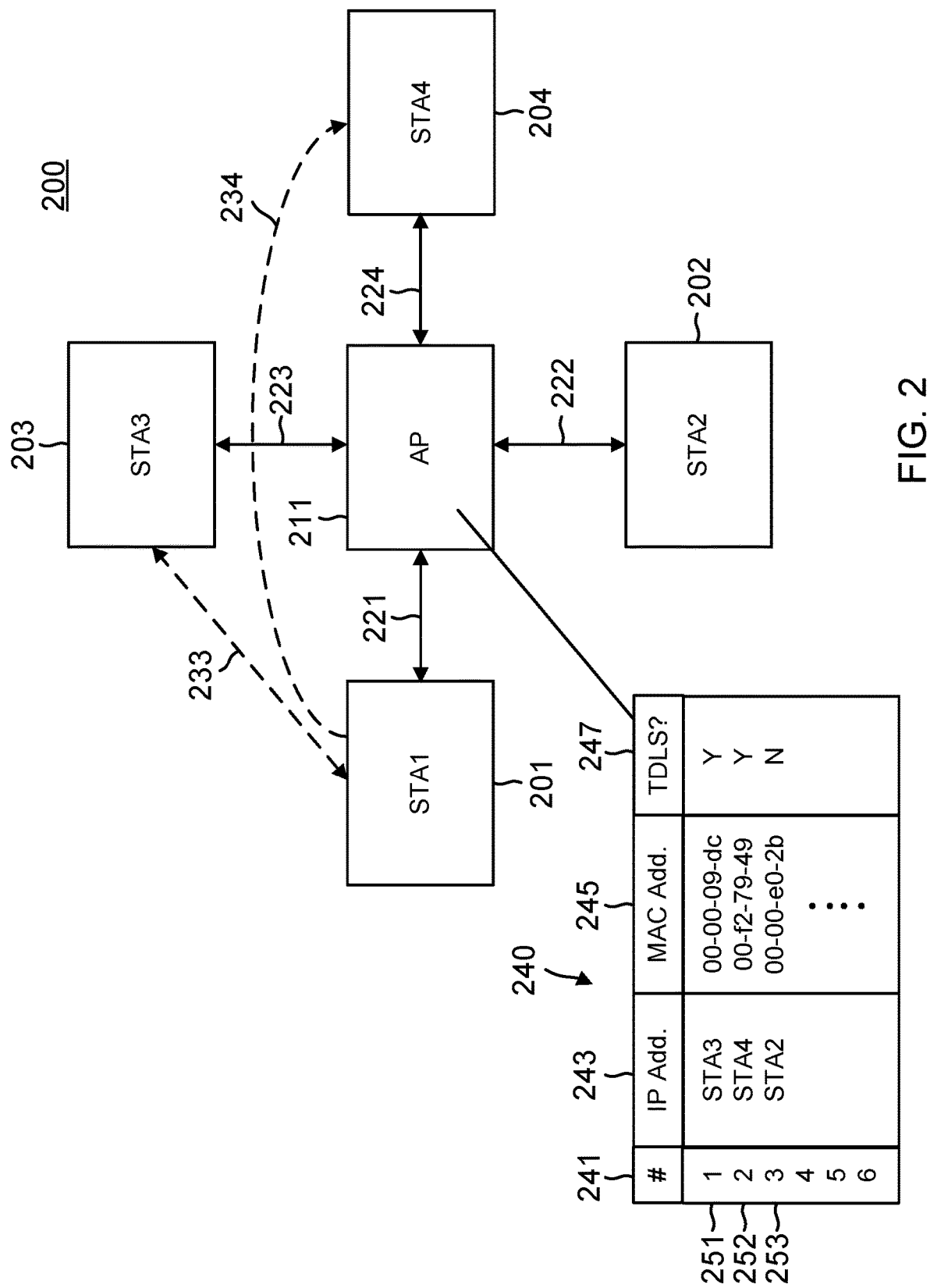
FIG. 2 is a conceptual diagram illustrating an exemplary embodiment of a wireless station (STA) peer-to-peer communications that is assisted by the access point (AP)

FIG. 2 is a conceptual diagram illustrating an exemplary embodiment of a wireless station (STA) direct communications that are assisted by an access point (AP). WLAN 200 is similar to WLAN 100 of FIG. 1 and includes STAs 201-204 and AP 211. WLAN includes AP-STA links 221-224, as well as STA direct links 233 and 234. AP 211 includes an STA list 240 that includes an ID field 241, an IP address field 243, a Media Access Control (MAC) address field 245, and a Tunneled Direct Link Setup (TDLS) capability indicator field 247. STA list 240 includes STA entries 251-253.

STA direct links 233-234 can enable data communications between STAs 201, 203, 204 in WLAN 200 without requiring AP 211 to relay data in data frames between STAs. In some exemplary embodiments, STA direct links 233-234 can be generated and maintained using the Tunneled Direct Link Setup (TDLS) protocol. The TDLS protocols may enable STAs like STAs 201-204 to connect directly to one another after they have joined WLAN 200. In some instances, STAs 201-204 using a communications channel setup and maintained in accordance with TDLS can generate setup frames encapsulated in data frames that are transmitted through an AP ("tunneling"). In some instances, the TDLS link can be established to transfer data using a different protocol than the links established between the STAs and the AP. In the illustrative embodiment, for example, STAs 201, 203 can establish links 221, 223, respectively with AP in accordance with the IEEE 802.11a standard, while establishing TDLS link 233 in accordance with the IEEE 802.11n standard.

In the illustrative embodiment, one or more STAs 201-204 can attempt to establish direct communications with one of the other STAs 201-204 in a WLAN. For example, in WLAN 200, STA 201 can attempt to establish direct communications with STAs 202-204 using TDLS to generate direct links. In the illustrative embodiment, STAs 203, 204 are TDLS capable; STA 201 can use TDLS to establish direct communication links with one or more of STAs 203, 204 independently. In such instances, STA 201 can manage communications on both TDLS communications channels of TDLS links 233-234 such that data is only communicated through one of the channels of TDLS links 233-234 at a time.

In some exemplary embodiments, STA 201 may not know whether any of STAs 202-204 are capable of establishing a link in compliance with TDLS. In some exemplary embodiments, STA 201 can attempt to determine whether any of STAs 202-204 are TDLS-compliant before attempting to setup a TDLS link. In some exemplary embodiments, STA 201 can send a request message, such as a TDLS discovery request frame, to each of STAs 202-204. In some embodiments, STA 201 can use information received in a TDLS discovery response frame to determine which of STAs 202-204 are capable of establishing direct links using TDLS.

In some exemplary embodiments, AP 211 can indicate to STA 201 which of the associated STAs 202-204 in WLAN 200 is capable of establishing direct communications using TDLS. In some exemplary embodiments, AP 211 can provide a TDLS-capability indication in a list 240. In some exemplary embodiments, list 240 can include a list of each associated STA in WLAN 200 and provide an indication of whether any STA of STAs 202-204 is TDLS-capable. In the illustrative embodiment, for example, STA list 240 includes TDLS-capability indicator field 247. In some exemplary embodiments, STA list 240 may comprise only entries of STAs that are capable of TDLS (i.e., a TDLS-compliant STA list). STA 201 can use the information included in list 240 (e.g., the MAC address indicated in MAC address field 245) to send request messages to only those STAs that are capable of TDLS.

In the illustrative embodiment for example, STA list 240 shows that only STAs 203-204 (as indicated by STA entries 251-252) are capable of TDLS. STA 201 can then send TDLS request messages to only STAs 203-204. In some exemplary embodiments, STA 201 can skip sending a TDLS request message and waiting for a TDLS response message indicating TDLS compliance; instead, STA 202 can use the information in STA list 240 to send a TDLS setup request message or a TDLS discovery request message to setup TDLS link 233, 234.

In some exemplary embodiments, AP 211 can update STA list 240 upon association or disassociation of an STA 201-204 with AP 211. For example, in some exemplary embodiments, AP 211 can determine the TDLS capability of an STA 201-204 during its association process of with AP 211. In such instances, AP 211 can update STA list 240 using the information provided by STA 201-204 during association. In the illustrative embodiment, for example, STA 201 can provide information, including identification information and TDLS-capability information, in an association request frame sent to AP 211. AP 211 can use the information provided by STA 201 in the association request frame to generate a new STA entry for STA list 240. In some exemplary embodiments, AP 211 can provide STA list 240 to the associating STA during the association process. For example, in the illustrative embodiment, AP 211 can provide STA list 240 to STA 201 as part of an association response frame when STA 201 attempts to associate with AP 211.

In some exemplary embodiments, AP 211 can update STA list 240. For example, in the illustrative embodiment, AP 211 can update STA list 240 when STA 201 associates with AP 211 by AP 211 adding to STA list 240 an STA entry that includes information relating to STA 201. Similarly, AP 211 can update STA list 240 by removing an STA entry from STA list 240 when one of the listed STAs disassociates with AP 211. In some exemplary embodiments, AP 211 can provide an updated STA list 240 ("update list") to STAs 201-204. In some embodiments, AP 211 can include the updated list in a message included in a frame sent to one or more STAs 201-204. In some exemplary embodiments, the update list is included in one or more data frames sent to STAs 201-204. In some exemplary embodiments, AP 211 includes the update list in message sent in a beacon frame broadcast to each STA 201-204. For example, when STA 201 associates itself with AP 211, AP 211 can update STA list 240 to include an STA entry for STA 201. AP 211 can then include the updated STA list 240 in a beacon frame and broadcast the beacon frame to STAs 201-204. In some other exemplary embodiments, the updated STA list 240 can be sent in any type of action frame.

While the exemplary embodiments of FIG. 2 have been described with respect to direct communications using TDLS capabilities, similar approaches can also be used in other exemplary embodiments for other types of tunneling protocols in a local wireless network that enable direct communications between one or more STAs 201-204.

Figure 3:
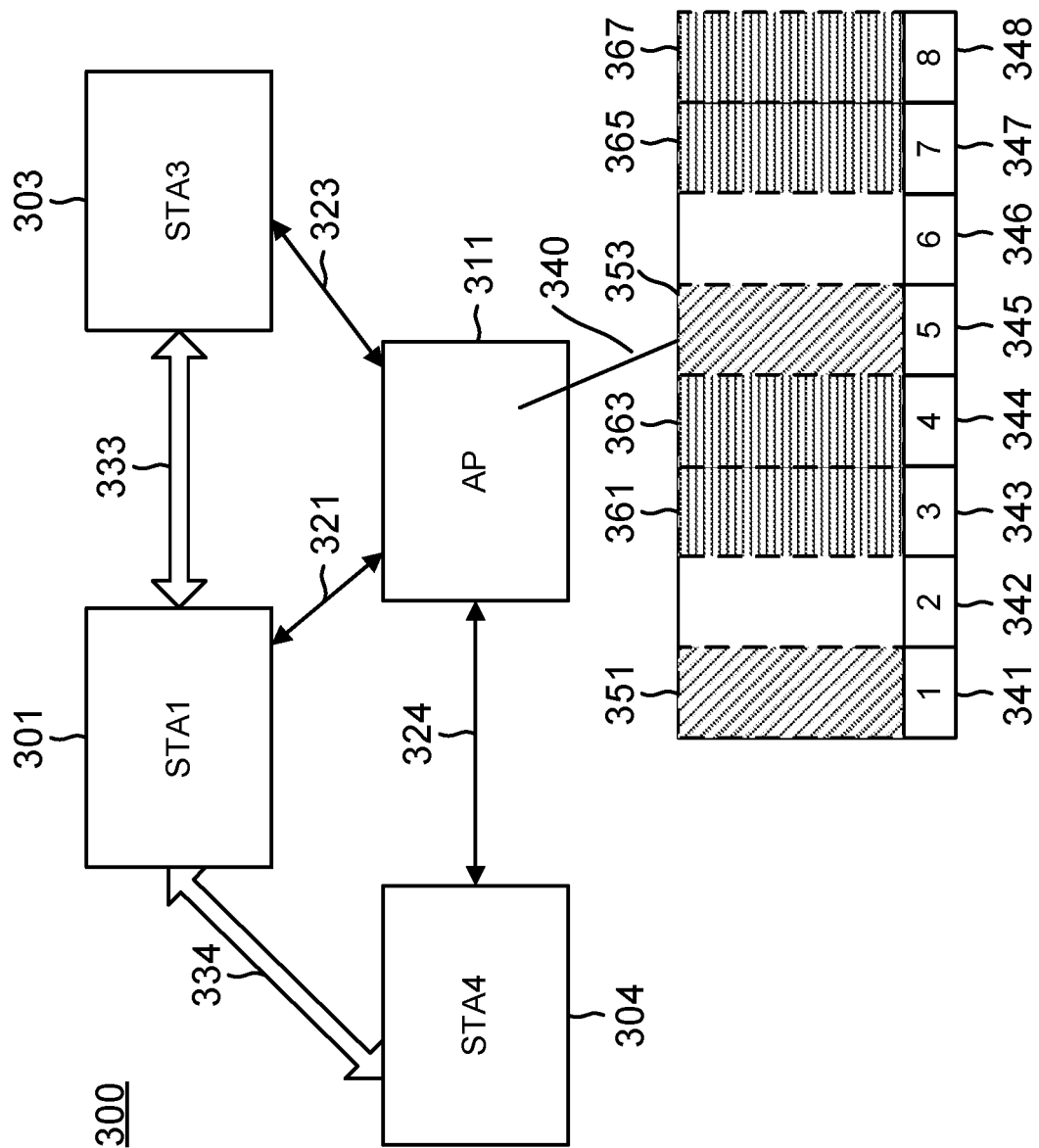
FIG. 3 is a conceptual diagram illustrating an exemplary embodiment of an STA direct communications that is managed by the AP.

FIG. 3 is a conceptual diagram illustrating an example embodiment of STA direct communications that are managed by the AP. WLAN 300 is similar to WLANs 100, 200 and includes STAs 301, 303, 304 and AP 311. STAs 301, 303, 304 are associated with AP 311 and have communications links 321, 323, 324 established with AP 311. TDLS-capable STA 301 has also established TDLS links 333, 334 with TDLS-capable STAs 303, 304, respectively. AP 311 also includes a schedule 340 for TDLS channel communications. Schedule 340 can include a number of time slots 341-348 that can be reserved for TDLS channel communications for any of the established TDLS links 333-334. In some exemplary embodiments, AP 311 can receive requests from STAs 301, 303, 304 to determine a TDLS link schedule that reserves one or more time slots 341-348 for data transmissions over the channels established by TDLS links 333-334. In some exemplary embodiments, one or more STAs 301, 303, 304 may go into power save mode during periods when it is not involved in data transfer via the direct link according to the wakeup schedule. An STA that receives a TDLS wakeup schedule can communicate the wakeup schedule with the peer STA via the direct link or via the AP.

In the illustrative embodiment for example, AP 211 can establish schedule 340 such that time slots 341 and 345 are reserved (as indicated by reservation slots 351, 353) and data is only transferred via TDLS link 333 between STAs 301, 303 at the reserved slots. Similarly, schedule 340 as established by AP 311 can indicate that time slots 343-344, 347-348 are reserved for data communications via the direct communications channel established by TDLS link 333 between STA 301 and STA 303. As shown by schedule 340, time slots 342, 346 are reserved and can be reserved for other TDLS communications, either for further data communications on an established TDLS links 333-334, or for data communications for a newly-established TDLS link.

As shown by schedule 340, STA 301 is not involved in data communications via TDLS links 333-334 during time slots 342, 346. During such intervals, STA 301 can transition into power save mode (PSM). Power saving is greatest when an STA is in the sleep state. When STA 301 is in sleep state, other STAs 303, 304 can buffer data to be transferred to STA 301. The buffered data can be transferred to STA 301 during the wake windows agreed upon in the TDLS wakeup schedule that was obtained from AP 311.

In some exemplary embodiments, AP 311 can generate schedule 340 based on a wakeup schedule request message received from one of the STAs 301, 303, 304. The wakeup schedule request message can include parameters for generating schedule 340, including parameters for the TDLS communications channel, wake duty cycles (e.g., the relative time the STA is active in contrast to the STA being in PSM), one or more intervals for waking, etc. AP 311 can generate a specific wakeup schedule for an STA 301, 303, 304 based on the received parameters and send the wakeup schedule to one or more of STAs 301, 303, 304. In some exemplary embodiments, an STA 301 can release the wakeup schedule provided by AP 311 in a wakeup schedule release message sent to AP 311. In some exemplary embodiments, STA 301 can send the wakeup schedule release message to release a wakeup schedule provided by AP 311. In some exemplary embodiments, STA 301 can send a wakeup schedule release message to end a period wakeup schedule as provided by AP 311.

In some exemplary embodiments, a wakeup schedule can comprise a schedule for an individual TDLS link. For example, AP 311 may provide a wakeup schedule to at least STA 301 for TDLS link 333, reserving slots 351, 353. In some exemplary embodiments, the wakeup schedule can include other parameters, including, for example, a frequency band for the TDLS channel, start and stop times based on target beacon transmission time (TBTT), and other TDLS direct link-related resources provided by AP 311. In such instances, STA 301 can receive multiple wakeup schedules based on each of the TDLS links 333, 334. In some exemplary embodiments, AP 311 can generate a wakeup schedule based on each of the TDLS links. In such instances, STA 301 can send one or more wakeup schedule request messages independently using separate parameters for each of TDLS links 333, 334. In the illustrative embodiment, for example, AP 311 can generate a single wakeup schedule for STA 301 based on both TDLS links 333, 334. STA 301 would then transfer in and out of PSM based on the complete wakeup schedule provided by AP 311.

In some exemplary embodiments, AP 311 can send wakeup schedules for one STA to a different STA in WLAN 300. In the illustrative embodiment, for example, AP 311 can send the wakeup schedule for STA 301 to STAs 303-304. In such instances, STAs 303-304 may not need to receive traffic indication frames for STA 301 or AP 311 to start and stop transmission of data with STA 301 via TDLS links 333, 334; rather, STAs 303-304 can use the received wakeup schedule for STA 301 to determine the reserved times for their respective TDLS links 333, 334 and can buffer and send data based on the intervals specified in the wakeup schedule.

Figure 4:
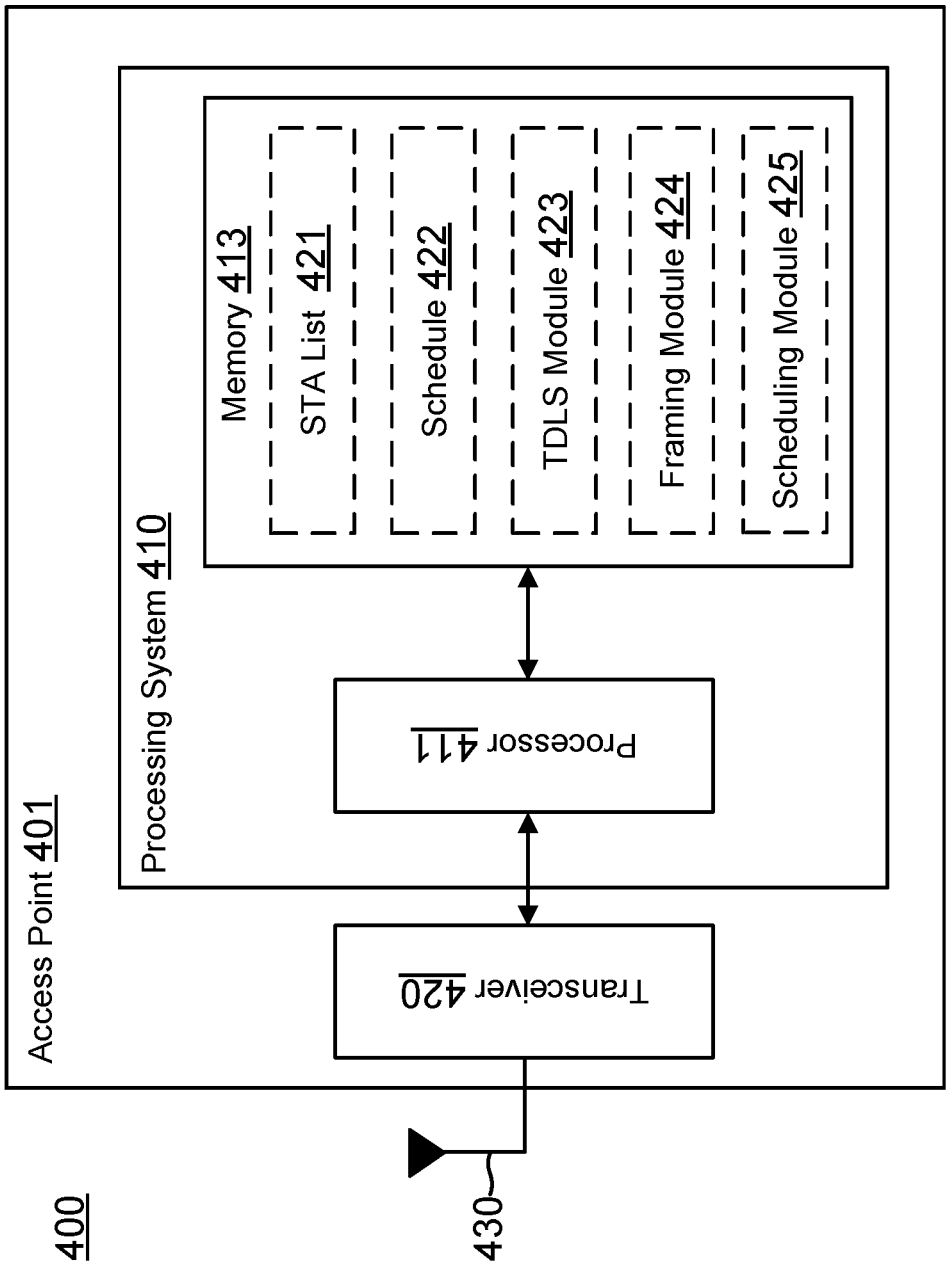
FIG. 4 is a block diagram illustrating an exemplary embodiment of an AP.

FIG. 4 is a functional block diagram illustrating an example of an access point. Block diagram 400 includes an Access Point (AP) 401 that has a processing system 410, a transceiver 420, and an antenna 430. Processing system 410 includes a processor 411 and a memory. Memory 413 can include one or more software modules and stored data structures, including a wireless station list (e.g., STA list) 421, a TDLS schedule 422, a TDLS module 423, a framing module 424, and a scheduling module 425. As will be discussed in relation to FIGS. 8-11, in some exemplary embodiments, AP 401 can include one or more of data structures and/or elements 421-425 to enable AP 401 to perform operations to assist one or more STAs in TDLS discovery and TDLS power-saving management.

Transceiver 420 can be a transmitter/receiver circuit that includes one or more chains of transmitter (TX) components and one or more chains of receiver (RX) components that can be used by AP 401 to send and receive packet through a wireless channel via antenna 430. The one or more TX chains included in transceiver 420 can receive messages (included in one or more frames) and send the received messages to processing system 410. The one or more RX chains included in transceiver 420 can receive messages (included in one or more frames) and send the messages through the communication channel using antenna 430. In an aspect, transceiver 420 can also include components for an RF front end to modulate signals for transmission and/or demodulate received signals.

Processing system 410 can be implemented with a bus architecture that includes any number of interconnecting buses and bridges. The bus links together various circuit in processing system 410, including processor 411 and memory 413. The bus may also link various other circuits, such as timing sources, peripherals, voltage regulators, power management circuits, etc., which are well known in the art, and therefore will not be described further.

Processor 411 is responsible for managing the bus and for general processing, including the execution of software instructions stored in memory 413. Processor 411 can load instructions from modules, including modules 423-425, and execute processes in accordance with the local instructions. In some exemplary embodiments, processor 411 can include one or more processors that are coordinated to perform processes for AP 401.

In some exemplary embodiments, memory 413 can include STA list 421, which can provide a way for maintaining a list of stations determined to be capable of supporting direct communications. STA list 421 can be stored such that it includes one or more STA entries 251-253 and information for fields 241-247, including a identifier for identifier field 241, an IP address of IP address field 243, a MAC address for MAC address field 245 (plus or alternatively including other identifying information), and a TDLS-capability indicator for TDLS-capability indicator field 247. Processor 411, using instructions loaded from TDLS module 423, can save entries for STA list 421 and the updated STA list 421 based at least in part on information received via framing module 424.

In some exemplary embodiments, memory 413 can include schedule 422, which can provide a way for storing a wakeup schedule. In some exemplary embodiments, schedule 422 can includes one or more wakeup schedules for TDLS links 333-334 established in the local network. Processor 411, using instructions from scheduling module 425, can determine periods for data communications using the one or more TDLS links 333-334 and can reserve periods to enable such data communications. In some exemplary embodiments, processor 411, using instructions from framing module 424, can generate wakeup schedule response messages to STAs 301, 303, 304 that include wakeup schedules based on schedule 422.

Memory 413 can also include a non-transitory computer-readable medium (e.g., one or more nonvolatile memory elements) that may include any number of software modules. Each software module can include a set of instructions that, when executed by processor 411, cause processing system 410 to perform various functions. In the illustrative embodiment, for example, memory 413 includes TDLS module 423, framing module 424, and scheduling module 425.

Several embodiments of the AP 401 may include one or more of TDLS module 423, framing module 424, and/or scheduling module 425. In some exemplary embodiments, all of the software modules 423-425 may be enabled to perform various aspects of the TDLS discovery and management algorithms. In some exemplary embodiments, one of the software modules may be enabled, while one or more of the others software module remains dormant. By way of example, the AP 401 may support TDLS discovery without power savings. The software modules that are dormant may be activated later in the field or at the factory to implement, for example, an upgrade in services. In some exemplary embodiments, only one of the software modules may be loaded into memory 413. In the case of an AP 401 with only part of the software modules 423-425 loaded into memory 413 at the factory, AP 401 may or may not be capable of being programmed later in the field, or at the factory, with the other software module. The actual implementation of the AP 401 will depend on a variety of factors including consumer demand, performance parameters, pricing, and other relevant factors.

TDLS module 423, when executed by the processor 411, for example, provides a way for determining whether an associated station (STA 201-204) is capable of direct communications while remaining associated with the communication device. In some exemplary embodiments, instructions provided by TDLS module 423 enable processor 411 to determine whether an STA is TDLS-capable. As discussed below, processor 411 can use instructions provided by framing module 424 to retrieve information from a received message. In some exemplary embodiments, the retrieved information can include an indication of whether an STA is TDLS-capable. In such instances, processor 411 can use instructions provided by TDLS module 423 to make a determination for the applicable STA based on the received TDLS-capability indication.

TDLS module 423, when executed by processor 411, can also provide a way for generating STA list 421 and for updating STA list 421. As discussed below, processor 411 can use instructions provided by framing module 424 to retrieve information from a received message. Processor 411 can use instructions provided by TDLS module 423 to generate an STA entry 251-253 using the information from the received message and add the generated STA entry to STA list 240. In some exemplary embodiments, processor 411 can use instructions from TDLS module 423 to update the list by either adding a newly-generated STA entry to STA list 421 or by removing and erasing an existing STA entry stored in STA list 421. Processor 411 can use instructions provided by TDLS module 423 to overwrite STA list 421 such that the updated list is stored in memory 413 as STA list 421.

Framing module 424, when executed by the processor 411, can provide ways, for example: for receiving a request, for providing STA list 421 to one or more STAs in response to a request, for providing schedule 422 to one or more STAs in response to a request, and for providing wakeup indications to an STA regarding the active state of another STA. In some exemplary embodiments, processor 411 can use instructions provided by framing module 424 to retrieve information included in a message and/or frame received by AP 401 through transceiver 420. In some exemplary embodiments, processor 411 can use instructions provided by framing module 424 to include information in a message and/or frame that is sent by AP 401 through transceiver 420.

For example, processing system 410 can receive a request, such as an association request message or a wakeup schedule request message, from an STA 301, 303, 304 through transceiver 420. Processor 411 can use instructions provided by framing module 424 to open the frame that included the request message. Processor 411 can also use instructions provided by framing module 424 to then retrieve the information included in the request message, which can include, for example: parameters for generating the wakeup schedule, identification information related to the sending STA, or an indication of whether the sending STA is capable of supporting TDLS.

In another example, processor 411 can use instructions provided by framing module 424 to package information, such as STA list 421, schedule 422, an STA active status indication, etc. into a message. In some exemplary embodiments, processor 411 can use instructions provided by framing module 424 to provide the message by including the message in a frame, such as a data frame, association response frame, probe response frame, beacon frame, or any action frame. In such instances, processing system 410 can send the frame that includes the information through transceiver 420 to, for example, one or more STAs.

In some exemplary embodiments, processor 411 can also use instructions provided by scheduling module 425 to determine a wakeup schedule for STA direct communications. For example, processor 411 can use information extracted from the wakeup schedule request message and can use instructions provided by scheduling module 425 to generate a wakeup schedule. The generated wakeup schedule can be stored memory 413 in schedule 422.

In some exemplary embodiments, processor 411 can also use instructions from scheduling module 425 to generate a wakeup schedule such that it avoids reserved times already stored in schedule 422. In some exemplary embodiments, processor 411 can use instructions provided by scheduling module 425 and parameters provided in the wakeup schedule request message to generate a wakeup schedule based at least in part on such parameters. For example, scheduling module 425 can provide instructions for processor 411 to reserve a specified frequency band based on parameters included in the wakeup schedule request message. Scheduling module 425 can also provide instructions for processor 411 to generate a wakeup schedule that can be included in a wakeup schedule response message.

Figure 5:
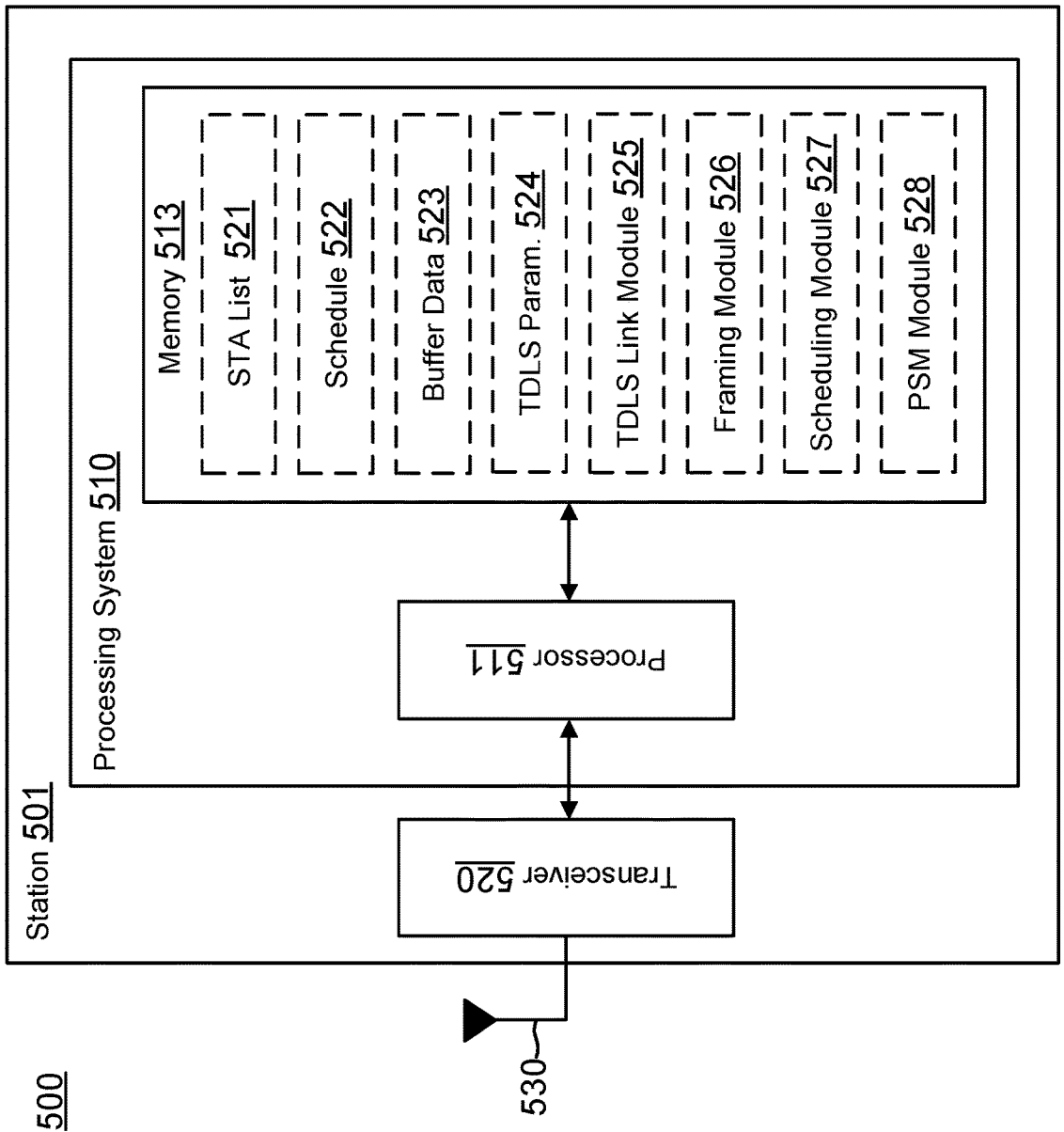
FIG. 5 is a block diagram illustrating an exemplary embodiment of an STA.

FIG. 5 is a functional block diagram illustrating an example of an STA. Block diagram 500 includes a station (STA) 501 that has a processing system 510, a transceiver 420, and an antenna 530. Processing system 510 includes a processor 511 and a memory 513. Memory 513 can include one or more software modules and stored data structures, including a wireless station (STA) list 521, a schedule 522, buffered data 523, TDLS link parameters 524, TDLS link module 525, framing module 526, scheduling module 527, and power save mode (PSM) module 528. As will be discussed in relation to FIGS. 8-11, in some exemplary embodiments, STA 501 can include one or more data structures and/or modules 521-528 to enable STA 501 to perform operations to enable communications using TDLS and manage TDLS communications.

Transceiver 520 is similar to transceiver 420 and can be a transmitter/receiver circuit that includes one or more chains of transmitter (TX) components and one or more chains of receiver (RX) components that can be used by STA 501 to send and receive packet through a wireless channel via antenna 530. The one or more TX chains included in transceiver 520 can receive messages (included in one or more frames) and send the received messages to processing system 510. The one or more RX chains included in transceiver 520 can receive messages (included in one or more frames) and send the messages through the communication channel using antenna 530. In an aspect, transceiver 420 can also include components for an RF front end to modulate signals for transmission and/or demodulate received signals.

Processing system 510 can be implemented with a bus architecture that includes any number of interconnecting buses and bridges. The bus links together various circuit in processing system 510, including processor 511 and memory 513. The bus may also link various other circuits, such as timing sources, peripherals, voltage regulators, power management circuits, etc., which are well known in the art, and therefore will not be described further.

Processor 511 is similar to processor 411 and is responsible for managing the bus and for general processing, including the execution of software instructions stored in memory 513. Processor 511 can load instructions from modules, including modules 525-528, and execute processes in accordance with the local instructions. In some exemplary embodiments, processor 511 can include one or more processors that are coordinated to perform processes for STA 501.

In some exemplary embodiments, memory 513 can include STA list 521, which can provide ways for maintaining a list of stations determined to be capable of supporting direct communications with STA 501. STA list 521 can be stored such that it includes one or more STA entries 251-253 and information for fields 241-247, including a identifier for identifier field 241, an IP address for IP address field 243, a MAC address for MAC address field 245 (plus optionally, or alternatively, other identifying information), and a TDLS-capability indicator for TDLS-capability indicator field 247. Processor 511, using instructions loaded from TDLS link module 525, can save entries for STA list 521 and the updated STA list 521 based at least in part on information received via framing module 526.

In some embodiments, memory 513 can store a schedule 522, which can provide ways for storing a wakeup schedule. In some embodiments, schedule 522 can include one or more wakeup schedules for TDLS links 333-334 established in the local network. Processor 511, using instructions from scheduling module 527, can determine periods for data communications using the one or more TDLS links 333-334 and can, using instructions from PSM module 528, perform power-saving operations, such as entering into sleep mode or awaking from sleep mode. Processor 511 can, using instructions provided by PSM module 528, perform operations during periods specified in schedule 522 to enable such data communications via one or more TDLS links 333-334. In some exemplary embodiments, processor 511, using instructions from framing module 526, can provide wakeup schedule request messages to AP 311 that includes stored TDLS link parameters 524.

Memory 513 can also include buffered data 523, which can provide ways to store data. STA 501 can store data in buffered data 523, for example, when it determines that data communications for a particular TDLS link 333-334 is suspended. This can occur, for example, when the other STA using TDLS link 333-334 indicates it is in a PSM. While the other STA is in PSM, STA 501 can store data in buffered data 523 until it receives an indication that is can transfer data to the STA via the TDLS link. In some exemplary embodiments, processing system 510 can receive the STA active status indication through a frame, such as a data frame or a traffic indication frame, or any action frame, received from AP 311. In some exemplary embodiments, scheduling module 527, when executed by the processor 511, can use information stored in schedule 522 and instructions for scheduling module 527 to determine when the other STA is in PSM or awake, buffering data until the other STA awakes for data transmission with STA 501 via the TDLS link.

Memory 513 can also store one or more TDLS link parameters 524 for the one or more TDLS links established between STA 501 and peer STAs. TDLS link parameters 524 can include certain quantitative attributes necessary to establish and maintain direct communications using a TDLS link. In some exemplary embodiments, processor 511 can use instructions from TDLS link module 525 to establish a TDLS link using TDLS link parameters 524 stored in memory. In some exemplary embodiments, processor 511, using instructions provided by framing module 526, can package TDLS parameters 524 into a wakeup schedule request message. Processor 511, using further instructions provided by framing module 526 can send the wakeup schedule request message in a frame, such as a data frame or a probe request frame, to request a wakeup schedule for an already-established TDLS link. In some exemplary embodiments, processor 511, using instructions provided by framing module 526, can generate a TDLS wakeup schedule request message based on TDLS link parameters 524. Processor 511 can then, using instructions from TDLS link module 525, establish a TDLS link based at least on TDLS link parameters 524 and the received wakeup schedule.

A TDLS parameter can be construed broadly to mean any parameter that has an effect on the wireless transmission on the TDLS link. By way of example, and without limitation, data rate and throughput are both TDLS parameters, as both parameters affect the bandwidth of the wireless transmission (i.e., how much data can be transmitted through the wireless medium for a given time frame). In some exemplary embodiments, TDLS link parameters 524 can include, but are not limited to, for example: data rate, minimum quality of service (QoS), frequency band, one or more independent wakeup intervals, security protocol, destination address, source address, etc.

Memory 513 can also include a non-transitory computer-readable medium (e.g., one or more nonvolatile memory elements) that may include any number of software modules. Each software module can include a set of instructions that, when executed by processor 511, cause processing system 510 to perform various functions. In the illustrative embodiment, for example, memory 513 includes TDLS link module 525, framing module 526, scheduling module 527, and PSM module 528.

Several embodiments of STA 501 may include one or more of TDLS link module 525, framing module 526, scheduling module 527, and PSM module 528. In some exemplary embodiments, all of the software modules 525-528 may be enabled to perform various aspects of the TDLS discovery and management algorithms. In some exemplary embodiments, one of the software modules may be enabled, while one or more of the others software module remains dormant. The software modules that are dormant may be activated later in the field or at the factory to implement, for example, an upgrade in services. In some exemplary embodiments, only one of the software modules may be loaded into memory 513. In the case of an STA 501 with only part of the software modules 525-528 loaded into memory 513 at the factory, STA 501 may or may not be capable of being programmed later in the field, or at the factory, with the other software module. The actual implementation of STA 501 will depend on a variety of factors including consumer demand, performance parameters, pricing, and other relevant factors.

TDLS link module 525, when executed by the processor 511, for example, provides ways for establishing direct communications with other STAs in the WLAN. In some exemplary embodiments, the TDLS link module 525 establishes a TDLS link with another STA 203-204 that is capable of handling a TDLS link 233-234. In some exemplary embodiments, TDLS link module 525 generates a TDLS discovery request messages and TDLS setup request messages to establish the TDLS link. In some exemplary embodiments, the TDLS discovery request message or TDLS setup request message can include an inquiry on the physical distance between STA 501 and the other STA. In some instances, both STAs may be too far away from each other to establish or maintain a TDLS link, though the STAs remain close enough to the AP to maintain association with the AP. In some exemplary embodiments, the TDLS link module 525 may be used to tear down the established TDLS link. This can occur, for example, when the conditions of the channel created by the TDLS link is too degraded or congested to send data reliably.

Framing module 526, when executed by the processor 511, can provide ways, for example: for receiving a list of stations capable of direct communications with STA 501 while remaining associated with AP 401, for sending an indication that STA 501 is TDLS-capable, for providing a request, for receiving a response, for receiving an STA active status indication, and for receiving a wakeup schedule. In some exemplary embodiments, framing module 526 may be used to retrieve information included in a message and/or frame received by STA 501 through transceiver 520. In some exemplary embodiments, framing module 526 may be used to include information in a message and/or a frame that is sent by STA 501 through transceiver 520.

For example, processing system 510 can receive a response, such as an association response message or a wakeup schedule response message, from an AP 401 through transceiver 520. Framing module 526 may be used to open the beacon frame that included the response message. Framing module 526 may then be used to retrieve the information included in the response message, which can include, for example: a list of TDLS-compliant stations, and updated TDLS-compliant list STA, a schedule (including, for example, times for STA 501 to sleep and times to awake), or an indication that another STA is in active mode.

In another example, framing module 526 may be used to package information, such as parameters for generating a wakeup schedule, identification information related to STA 501, or an indication that STA 501 is TDLS-capable, etc., into a message. In some exemplary embodiments, framing module 526 may be used to provide the message by including the message in a frame, such as a data frame, association request frame, or probe request frame. In such instances, processing system 510 can send the frame that includes the information through transceiver 520 to, for example, AP 401.

Scheduling module 527, when executed by processor 511, can provide ways for interpreting the wakeup schedule as stored in schedule 522. Scheduling module 527 may be used to determine which times to sleep and awake. In such instances, scheduling module 527 may be used to trigger PSM module 528 to enter into or out of PSM.

In some embodiments, scheduling module 527 may be used to interpret the wakeup schedule for another STA. In such instances, processor 411, using instructions provided by scheduling module 527, can determine whether another STA is in PSM or is active. In instances where scheduling module 527 is used to determine that the other STA is active, processing system 510 can send to the other STA the data stored in buffered data 523. In some embodiments, scheduling module 527 can be used to interpret a received STA active status indication. In instances where scheduling module 527 is used to interpret the received indication to determine that the other STA is active, processing system 510 can send to the other STA the data stored in buffered data 523.

PSM module 528 can provide ways for STA 501 to enter into and out of a power-saving mode. PSM module 528 may be used to enter into and out off PSM. For example, when a scheduled sleep period begins, PSM module 528 may be used to force the station into a power-saving mode. Similarly, when a scheduled active period begins, the PSM module 528 may be used to exit its power-saving mode and become active.

Figure 6:
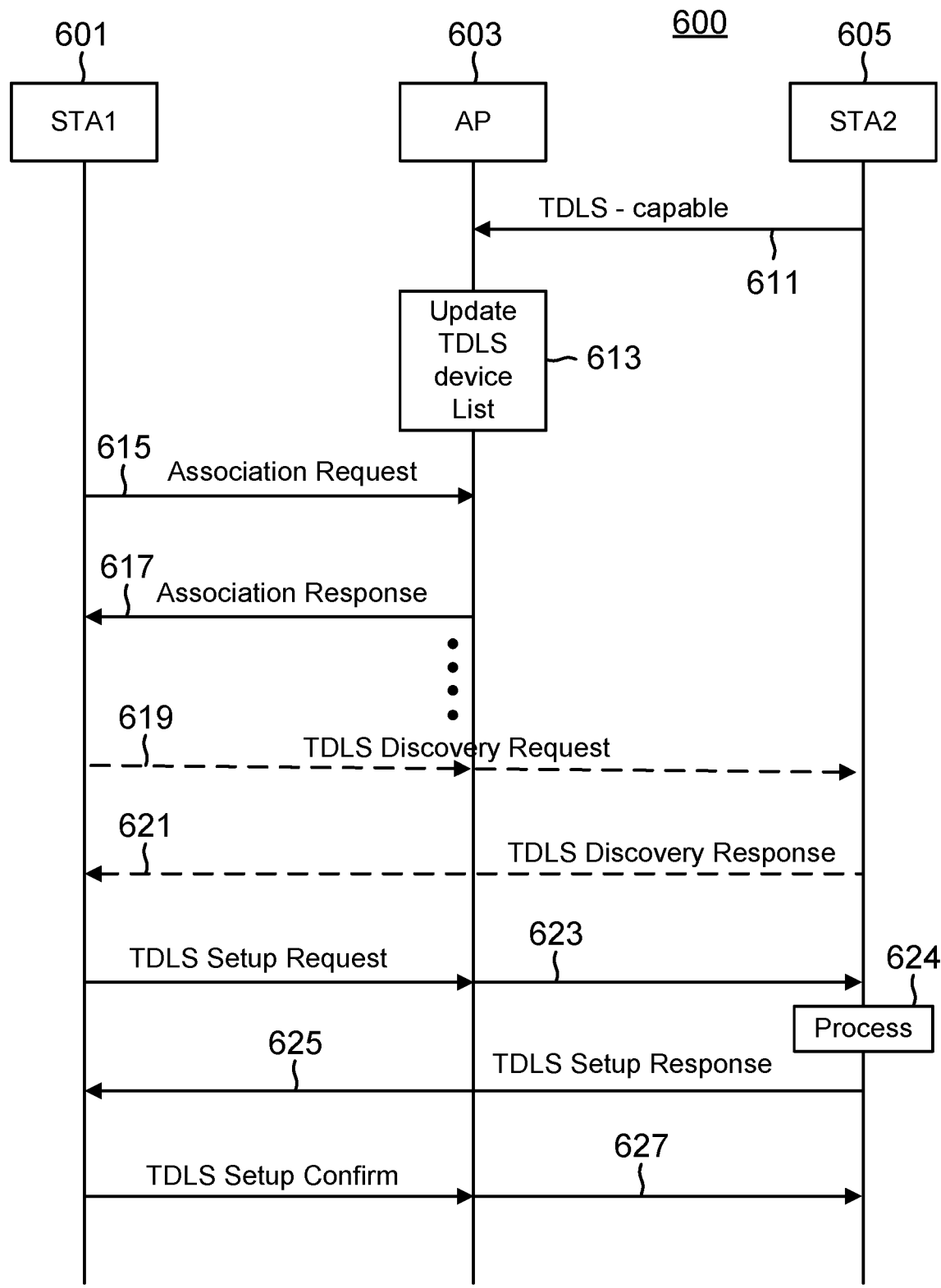
FIG. 6 is a signaling diagram illustrating an example of direct communications discovery operation between an AP and two STAs.

FIG. 6 is a signaling diagram illustrating an example direct communications discovery operation between an AP and two STAs. Signaling diagram 600 includes a first STA 601, an AP 603, and a second STA 605. AP 603 can be similar to AP 401 and can include the same components as described in relation to FIG. 4. STAs 601 and 605 can be similar to STA 501 and can include the same components as described in relation to FIG. 5. AP 603 can operate with STAs 601, 605 to assist in TDLS discovery such that STA 601 uses information provided by AP 603 to establish a TDLS link with STA 605.

STA 605 can initiate the operation illustrated in signaling diagram 600 by sending a message 611 to AP 603 indicating that STA 605 is capable of support communications using a TDLS link. In some exemplary embodiments, message 611 can comprise an association request message in an association request frame to AP 603 that includes an indication that STA 605 is TDLS-capable. AP 603 can then, at block 613, update STA list 240 to include an STA entry for STA 605. This entry can include other information associated with STA 605, such as its MAC address and IP address.

At a later time, STA 601 can attempt to associate with AP 603 by sending association request message 615. In some exemplary embodiments, STA 601 can include, for example a TDLS-capable indication in association request message 615. In such instances, AP 603 may update the STA list to include an entry for STA 601. In some exemplary embodiments, association request message 615 can be included in an association request frame.

AP 603 can send an association response message 617 to STA 601. In some exemplary embodiments, association response message 617 can be included in an association response frame. In some exemplary embodiments, AP 603 can include the current STA list 240 in association response message 617. In the illustrative embodiment, for example, AP 603 can send STA list 240, including an entry for STA 605, in association response message 617.

At a later time, STA 601 can attempt to establish a TDLS link with STA 605 by optionally sending TDLS discovery request message 619 to STA 605. In some exemplary embodiments, TDLS discovery request message 619 can be included in a data frame or in a probe request frame that is tunneled through AP 603 to STA 605. In some exemplary embodiments, STA 601 can use STA list 240 received from AP 603 as a filter. In such instances, STA 601 only sends TDLS discovery request message 619 to STA 605 when it first determines, using the TLDS indicator in the STA entry, that STA 605 is TDLS-capable. In some exemplary embodiments, TDLS discovery request message 619 can include other queries needed to establish the TDLS link. For example, TDLS discovery request message 619 can include a query on the physical location of STA 605. STA 603 can use the physical location to determine whether a TDLS link with STA 605 is viable.

Once STA 605 receives TDLS discovery request message 619, STA 605 can generate and send a TDLS discovery response message 621. In some exemplary embodiments, TDLS discovery response message 621 can be included in a data frame in a probe response frame tunneled through AP 603 to STA 601. In some exemplary embodiments, STA 605 can indicate, for example, its physical location and whether the station is TDLS-capable.

In some exemplary embodiments, STA 601 can use the information included in the TDLS discovery response message 621 to determine whether to attempt to establish a TDLS link with STA 605. If the STA 601 determines to make a TDLS link establishment attempt, STA 601 can send TDLS setup request message 623 to STA 605. In some exemplary embodiments, TDLS setup request message 623 can be included in a data frame or in a probe request frame tunneled through AP 603 to STA 605. In some exemplary embodiments, STA 601 can use the information included in STA list 240 to send TDLS setup request message 623 without sending TDLS discovery request message 619. In such instances, TDLS setup request message 623 can include, for example, a query about the physical location of STA 605. In some exemplary embodiments, TDLS setup request message 623 can include proposed TDLS service parameters for the TDLS link to be established.

Once STA 605 receives TDLS setup request message 623, STA 605 can, at block 624, process the setup request message 623 and then send a TDLS setup response message 625. In some exemplary embodiments, TDLS setup response message 625 can be included in a data frame or in a probe response frame tunneled through AP 603 to STA 601. In some exemplary embodiments, TDLS setup response message 625 can include, for example, the physical location of STA 605. In some exemplary embodiments, TDLS setup response message 625 can include TDLS service parameters for the TDLS link to be established. In some exemplary embodiments, the TDLS service parameters may be the same as those proposed in setup request message 623; in other exemplary embodiments, one or more of the TDLS service parameters may be added or modified from those proposed.

STA 601 can receive TDLS setup response message 625 and can send a TDLS setup confirmation message 627. In some exemplary embodiments, TDLS setup confirmation message 627 can be included in a data frame or in a probe response message tunneled through AP 603 to STA 605. TDLS setup confirmation message 627 can be used to confirm the establishment of a TDLS link between STAs 601, 605. In some exemplary embodiments, the TDLS link established uses the TDLS service parameters provided in the TDLS setup response message 625. In some exemplary embodiments, TDLS link module 525 may be used to save the specified TDLS service parameters in memory as TDLS parameters 524.

Figure 7:
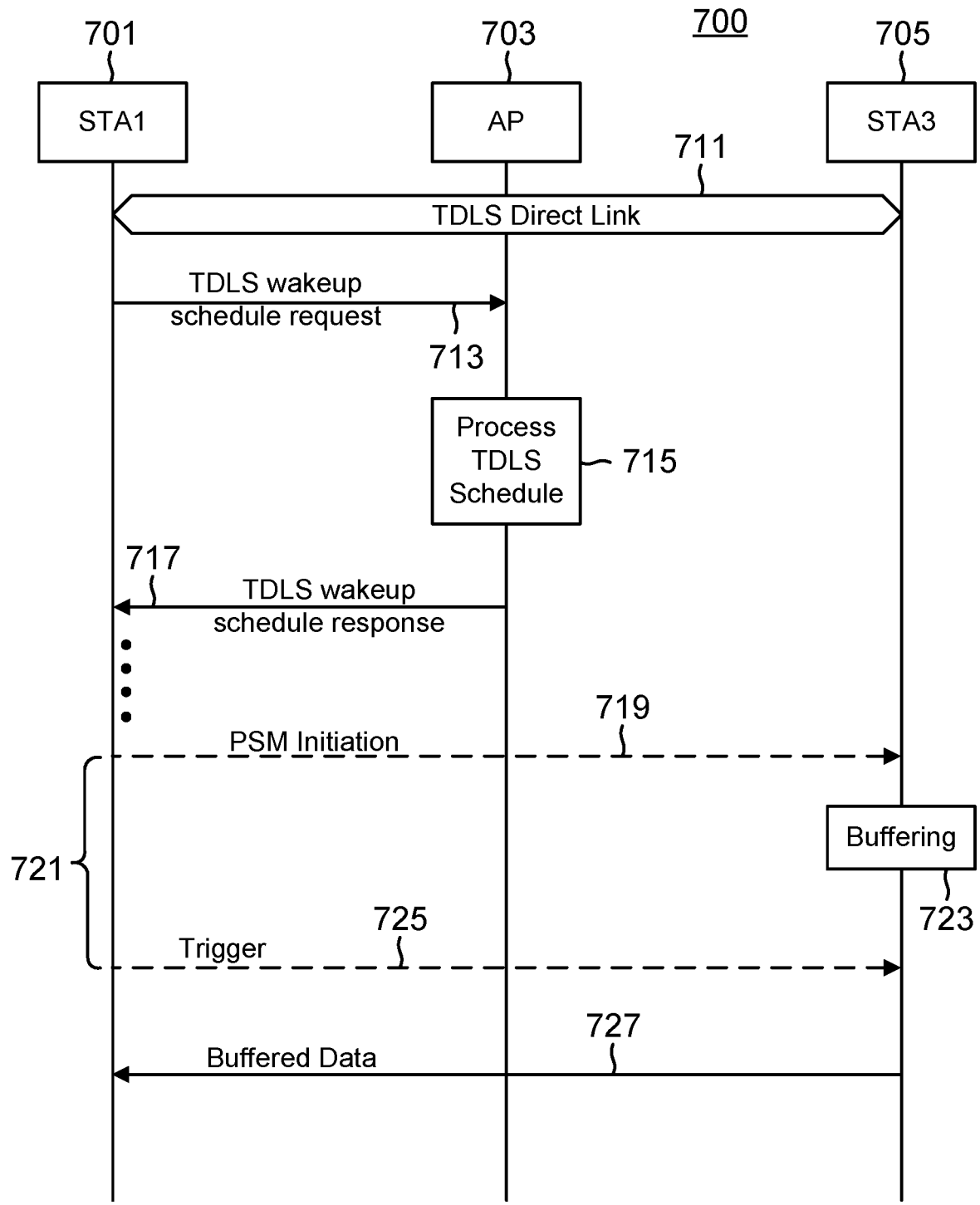
FIG. 7 is a signaling diagram illustrating an example of direct communications management operation between an AP and two STAs.

FIG. 7 is a signaling diagram illustrating an example direct communications management operation between an AP and two STAs. Signaling diagram 700 includes a first STA 701, an AP 703, and a second STA 705, which are similar to devices 601-605 of signaling diagram 600. AP 703 can be similar to AP 401 and can include the same components as described in relation to FIG. 4. STAs 701 and 703 can be similar to STA 501 and can include the same components as described in relation to FIG. 5. AP 703 can operate with STAs 701, 705 to assist in power-saving operations for the TDLS link between STAs 701, 705 such that multiple TDLS links within a WLAN can be coordinated efficiently.

STAs 701, 705 can initiate the operation illustrated in signaling diagram 600 by establishing a TDLS direct link 711 between STA 701 and STA 705. In some exemplary embodiments, TDLS direct link 711 is established in accordance with the operation established in signaling diagram 600. In some exemplary embodiments, TDLS direct link may be similar to established TDLS links 233, 234, 333, and 334. TDLS direct link 711 can have a number of TDLS service parameters associated with it that relate to the establishment, operation, and maintenance of TDLS direct link 711.

After TDLS direct link 711 is established, STA 701 can send a TDLS wakeup schedule request message 713. In some exemplary embodiments, TDLS wakeup schedule request message 713 can be included in a data frame or in a probe request frame (or any other frame) to AP 703. In some exemplary embodiments, STA 701 sends wakeup schedule request message 713 to AP 703 before establishing TDLS direct link 711. In such instances, STA 701 can use the subsequent wakeup schedule provided by AP 703 when establishing TDLS direct link 711. In some exemplary embodiments, STA 701 can include one or more TDLS parameters 524 in wakeup schedule request message 713.

Upon receipt of wakeup schedule request message 713, AP 703 can, in block 715, process a TDLS wakeup schedule for TDLS direct link 711. In some exemplary embodiments, AP 703 uses one or more TDLS parameters included in wakeup schedule request message 713 to generate a schedule for TDLS direct link 711. In some exemplary embodiments, AP 703 can refer to schedule 340, 422 when generating a wakeup schedule for TDLS direct link 711. In such instances, AP 703 can set up wakeup times and one or more period wakeup intervals based at least in part on available TDLS transmission periods, avoiding any times reserved for other TDLS communications. In some exemplary embodiments, the generated wakeup schedule may include one or more independent periodic wakeup intervals (i.e., times between an STA waking from PSM). The group of periodic wakeup intervals and other parameters (e.g., wake/sleep duty cycle, transmission frequency band, etc.) can be included in the wakeup schedule generated by AP 703.

AP 703 can send the wakeup schedule generated in block 715 for TDLS direct link 711 in TDLS wakeup schedule response message 717 to STA 701. In some exemplary embodiments, AP 703 can send wakeup response message 717 to STA 701 in a data frame, beacon frame, or probe response frame (or any other frame). In some exemplary embodiments, AP 703 can send the generated wakeup schedule to other STAs in the WLAN (e.g., STA 705). In such instances, the recipient STA can use the wakeup schedule for the TDLS link to determine when STA 701 is sleep or active. In the illustrative embodiment, for example, STA 705 can use the wakeup schedule for STA 701 generated by AP 703 in block 715 to determine when STA 701 is sleep or active for TDLS direct link 711. STA 705 can then use such determinations to buffer data to be sent to STA 701 during scheduled sleep periods, without receiving traffic indication frames from AP 703 each time.

At a later time, STA 701 can optionally generate and send a PSM initiation message 719 to STA 705. In some exemplary embodiments, PSM initiation message can be included in a data frame in a probe request frame and send to STA 705 through TDLS direct link 711 or tunneled through AP 703. STA 701 can generate PSM initiation message 719 based on at least in part the scheduled sleep time as specified in the wakeup schedule included in wakeup schedule response message 717. In some exemplary embodiments, STA 701 does not generate PSM initiation message 719; in such instances, STA 701 goes into PSM without sending PSM initiation message 719 at the scheduled sleep time.

Once STA 701 goes to sleep (i.e., enters PSM), STA 701 can wait for sleep time interval 721. In some exemplary embodiments, sleep time interval 721 is based at least in part on both the waking interval and a wake/sleep duty cycle provided in the wakeup schedule generated by AP 703. In some exemplary embodiments, the wakeup schedule generated by AP 703 can include a specified sleep time interval. During sleep time interval 721, STA is sleep and does not receive any frames from either AP 703 or STA 705. During this period, STA 705 can buffer any data meant for STA 701, as shown in block 723.

When sleep time interval 721 is complete, STA 701 can optionally, at the scheduled time, generate and send active trigger message 725 to STA 705. In some exemplary embodiments, active trigger message 725 can be included in a data frame, in a probe request frame, or in a request to send (RTS) frame.

Upon receipt of active trigger message 725, STA 705 can send the data buffered in block 723 to STA 701 in one or more buffered data messages 727 in one or more data frames via TDLS direct link 711. In some exemplary embodiments, STA 701 awakes at the scheduled time without sending active trigger message 725 to STA 705. In such instances, STA 705 can begin sending data buffered in block 723 at the scheduled awake time for STA 701 in one or more buffered data messages 727 packaged in one or more data frames.

Figure 8:
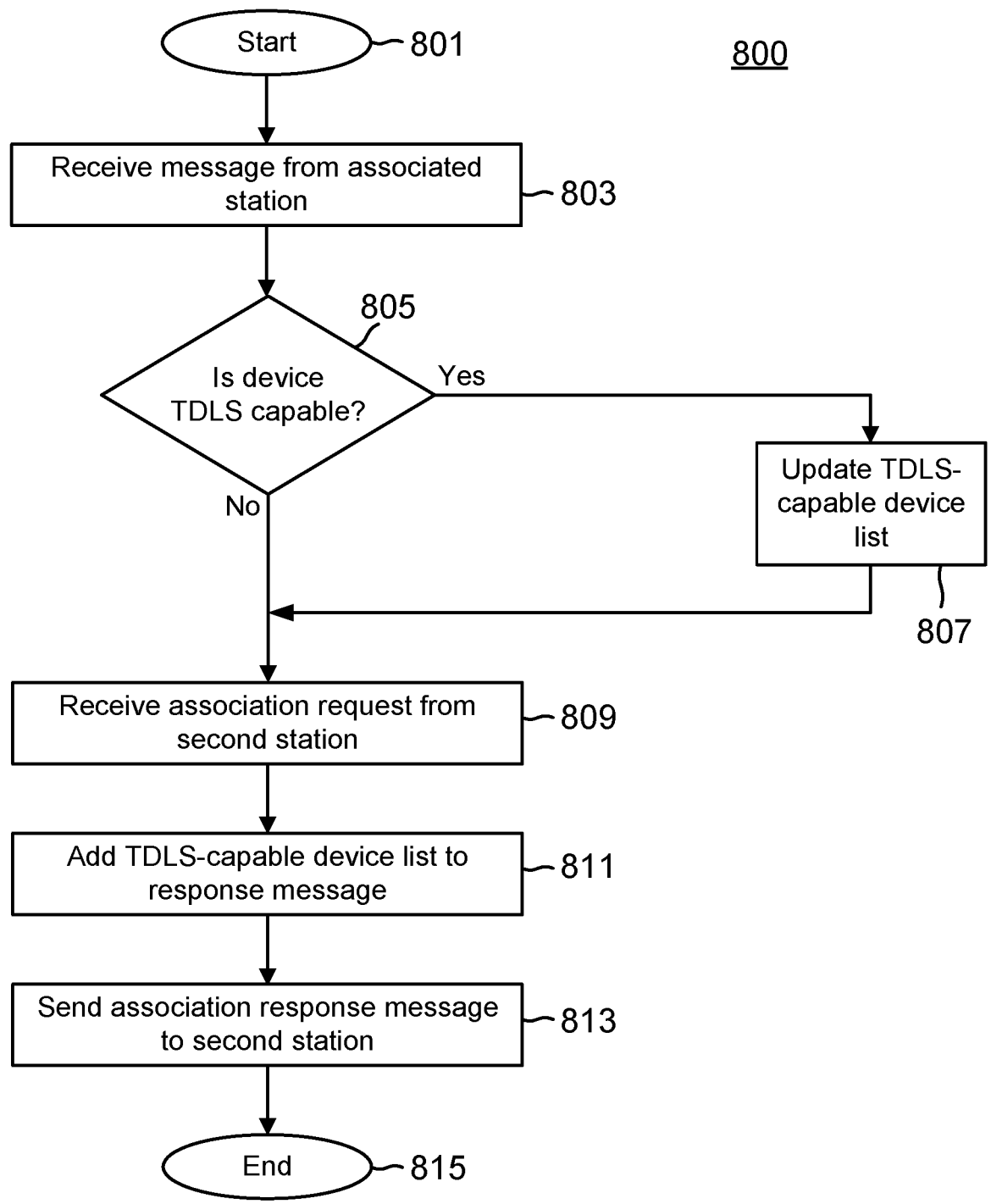
FIG. 8 is a flow chart illustrating an example of an STA direct communications operation assisted by an AP.

FIG. 8 is a flow chart illustrating an example of STA direct communications operation assisted by an AP. AP 211, 401 can perform method 800 using TDLS module 423 and framing module 424, respectively, as executed by processor 411. AP 211, 401 can perform method 800, for example, when assisting STA 201, 501 in establishing a TDLS link with another STA in the WLAN.

Method 800 can begin at block 801 and proceed to block 803, where AP 401 receives a message from an associated STA. Framing module 424 can be used to receive a message and/or frame received by processing system 410 via transceiver 420. In some exemplary embodiments, the message can be an association request message 611 included in an association request frame sent from an STA.

In block 805, AP 401 can determine whether the associated station that sent the message is capable of direct communications. In some exemplary embodiments, TDLS module 423 can be used to review the information included in the association request message 611, such as a TDLS-compliant indicator. If TDLS module 423 determines in block 805 that the sender STA is TDLS-capable, TDLS module 423 can, in block 807, be used to update the TDLS-capable STA list to include the sender STA. In some exemplary embodiments, TDLS module 423 may be used to add an entry to STA list 421 to include information related to the STA that sent the message received in block 803. In some exemplary embodiments, the STA list is only updated with TDLS-compliant devices in block 807. In other embodiments, the STA list is updated after block 805; in such instances, an entry is added to the STA list that includes an indication of whether the sender STA is TDLS-capable.

After either block 805 or 807, AP 401 can, in block 809, receive an association request message 615 from a different STA. In some exemplary embodiments, framing module 424 can be used to receive an association request message in an association request frame.

In block 811, AP 401 can then add the TDLS-capable device list in a response message to the second STA. Framing module 424 can be used to generate and send a response message that is included in an association request frame to the sending STA. In some exemplary embodiments, framing module 424 can be used to include a complete STA list 240, 421 in the message. TDLS module 423 may be used to generate the list, while framing module 424 can be used to first generate the message and then to generate the frame.

In block 813, AP 401 can send the response message to the second station. Framing module 424 may be used to send the response message in an association response frame to the second STA. In some exemplary embodiments, framing module 424 can be used to send a complete STA list 240, 421 in the message to the second STA; in other embodiments, the message includes the TDLS-capable STA list. Once framing module 424 sends the response message to the second station in 813, the process is complete at block 815.

Figure 9:
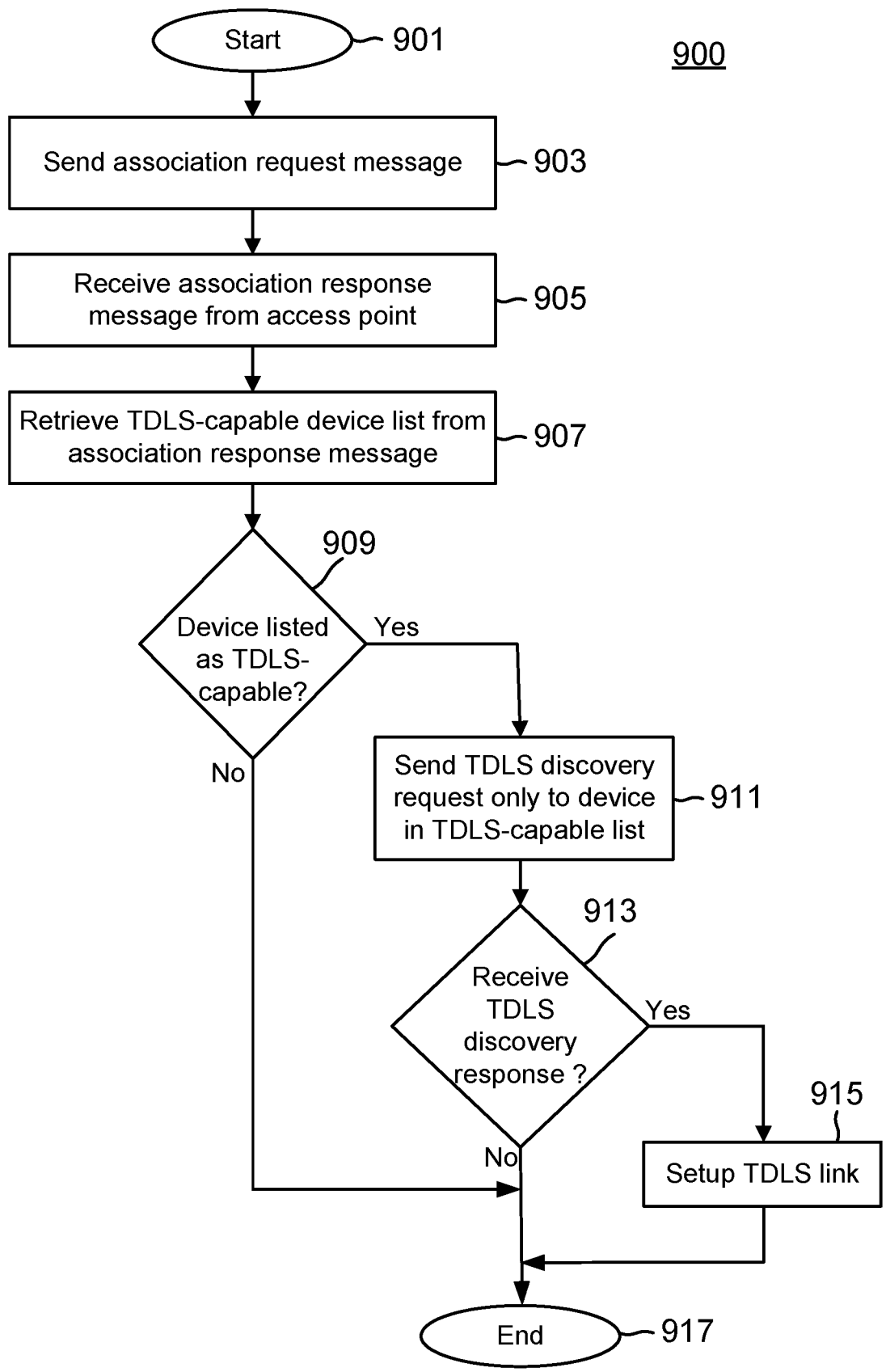
FIG. 9 is a flow chart illustrating an example of an STA direct communications operation by an STA.

FIG. 9 is a flow chart illustrating an example of a STA direct communications operation by an STA. STA 201, 501 can perform method 900 using TDLS link module 525 and framing module 526, respectively, as executed by processor 511. STA 201, 501 can perform method 900, for example, when attempting to establish a TDLS link to another STA in the WLAN.

Method 900 can begin at block 901 and proceeds to block 903, where STA 501 sends an association request message to AP 211, 401. In some exemplary embodiments, framing module 526 first can be used to generate an association request message 615 and then generate an association request frame.

After sending the association request message, STA 501 can, in block 905, receive an association response message from AP 401. Framing module 526 can be used to receive an association response frame from AP 401 and then retrieve association response message 617 from the received association response frame.

In block 907, STA 501 can retrieve the TDLS-capable device list from the association response message. Framing module 526 can be used to retrieve the TDLS-capable device list from association response message 617. In some exemplary embodiments, association response message 617 can include a TDLS-capable device list; in other exemplary embodiments, association response message 617 can include an STA list that includes all associated devices in the WLAN, with each STA entry including a TDLS capability indicator.

Once the list is retrieved in 907, STA 501 can then proceed to block 909, where it determines if a device is listed as TDLS capable in the retrieved list. TDLS link module 525 can be used to determine if a target station for which STA 501 wishes to establish a TDLS link is listed in the TDLS-capable device list. In other embodiments, TDLS link module 525 can be used to determine if the target station has a related STA entry in the STA list that indicates it is TDLS-capable. If, at block 909, TDLS link module 525 can be used to determine that the target station is not TDLS-capable, the process is complete at block 917.

If, however, STA 501 determines, using the list, that the target station is TDLS-capable, STA 501 can proceed to block 911, where STA 501 sends a TDLS setup request message 623 to the target station. Framing module 526 can be used to provide TDLS setup request message 623 in a data frame or probe request frame. In some exemplary embodiments, framing module 526 can be used to optionally send a TDLS discovery request message 619 to the target STA.

In some exemplary embodiments, TDLS link module 525 can be used to use the list as a filter such that TDLS setup request message 623 is only sent to the TDLS-compliant STA. In some exemplary embodiments, TDLS link module 525 can be used to generate TLDS service parameters that are stored as TDLS link parameters 524 in memory 513. Framing module 526 can then be used to generate TDLS setup request message 623 and generate a data frame or a probe request frame that includes TDLS setup request message 623.

In block 913, STA 501 can determine whether it received a TDLS setup response message. Framing module 526 can be used to receive a data frame or a probe response frame through transceiver 520. TDLS link module 525 can then be used to determine whether the other station sent appropriate TDLS service parameters to establish the TDLS link. If the other station sent a NACK message, a rejection message, or a TDLS setup response message that included TDLS service parameters that would not be able to establish a proper TDLS link (e.g., a physical location outside the range of the TDLS link to be established), STA 501 can abandon establishment of the TDLS link and the process is complete at block 917.

If STA 501 in block 913 receives a TDLS setup response message 625 that enables the establishment of a TDLS link, STA 501 can proceed to block 915, where it completes setup of a TDLS link. In some exemplary embodiments, TDLS link module 525 can be used to use TDLS link parameters 524 to establish a TDLS direct link with the other station. Once the station is established, the method 900 is complete at block 917.

Figure 10:
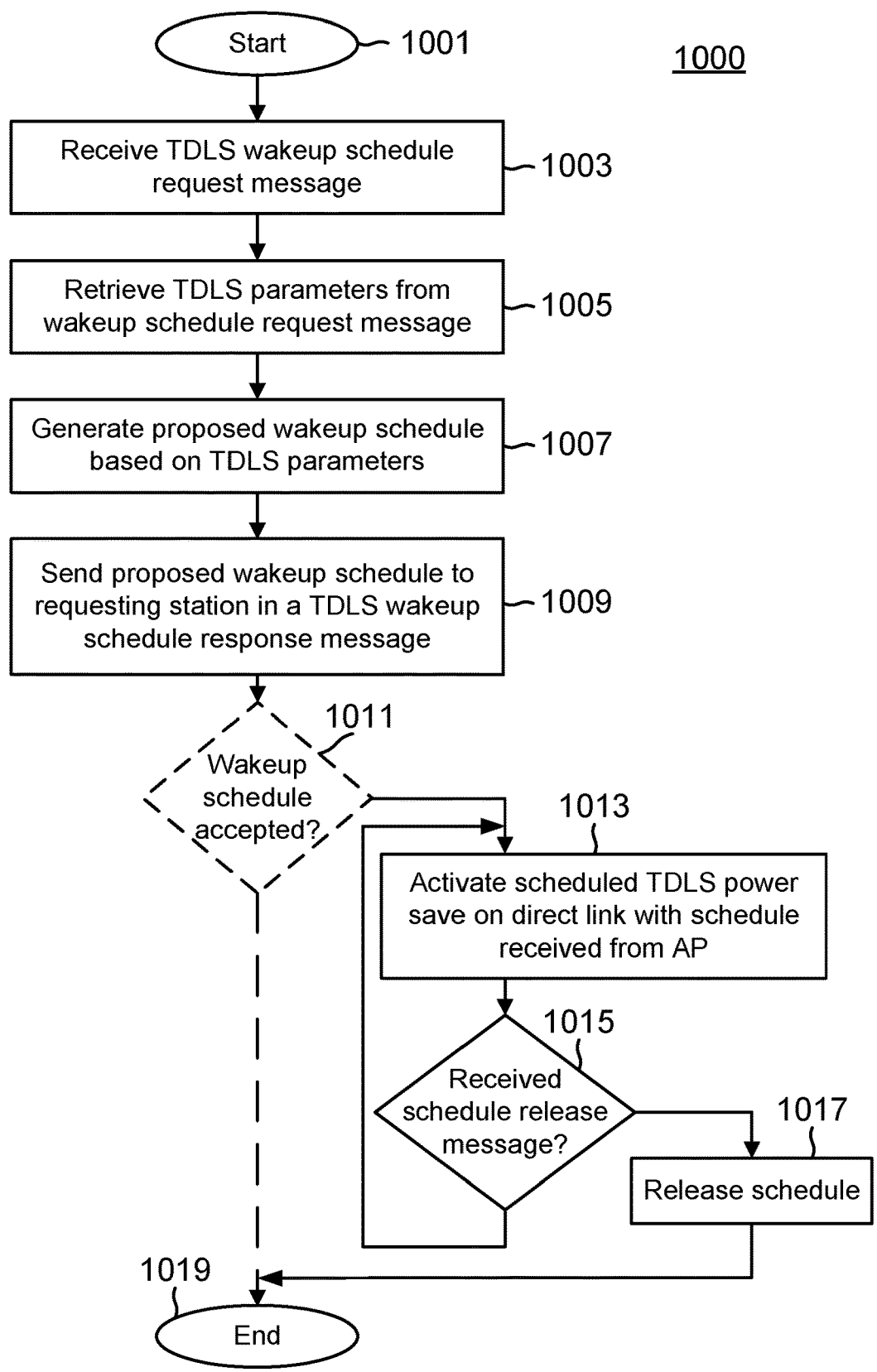
FIG. 10 is a flow chart illustrating an example of an STA direct communications management operation assisted by an AP.

FIG. 10 is a flow chart illustrating an example of a STA direct communications management operation assisted by an AP. AP 311, 401 can perform method 1000 using framing module 424 and scheduling module 425, respectively, as executed by processor 411. AP 311, 401 can perform method 1000, for example, when assisting STA 301, 501 in establishing scheduled times to sleep and awake from a power-saving mode.

Method 1000 can begin at block 1001 and proceed to block 1003, where AP 401 receives a TDLS wakeup schedule request message. Framing module 424 can be used to receive a data frame or a probe request frame through transceiver 420 and retrieve wakeup schedule request message 713.

AP 401 at 1005 can then retrieve TDLS parameters 524 from the wakeup schedule request message 713. In some exemplary embodiments, framing module 424 can be used to retrieve one or more TDLS parameters 524 included in wakeup schedule request message 713. In some exemplary embodiments, TDLS parameters 524 can include parameters related to an established TDLS link, such as the frequency band of the channel and data packet size. In some exemplary embodiments, TDLS parameters 524 can also include desired parameters for the wakeup schedule, such as a desired wakeup interval and a desired wake/sleep duty cycle.

In block 1007, AP 401 can generate a wakeup schedule based at least in part on the received wakeup schedule request message 713. In some exemplary embodiments, scheduling module 425 can be used to generate a wakeup schedule based at least in part on the received wakeup schedule request message 713. In some exemplary embodiments, the wakeup schedule uses one or more TDLS parameters 524 included in wakeup schedule request message 713 to generate the wakeup schedule. In some exemplary embodiments, scheduling module 425 can also be used to refer to a schedule 422 already saved in memory 413 such that the newly-generated wakeup schedule does not include active transmission periods that are already reserved for other established TDLS links.

Once the wakeup schedule for the applicable TDLS link is generated, AP 401 in block 1009 can send the wakeup schedule to one or more STAs in a wakeup schedule response message 717. Framing module 526 can be used to send wakeup schedule response message 717 in a data frame, probe response frame, a beacon frame (or any other frame). In some exemplary embodiments, framing module 526 can be used to send the wakeup schedule to just the STA that sent wakeup schedule request message 713. In some exemplary embodiments, framing module 526 can be used to send the wakeup schedule in a beacon frame to one or more other STAs in the WLAN such that the other STAs know the active and inactive schedule of the STA and the applicable TDLS link.

In block 1011, AP 401 can determine whether the wakeup schedule is accepted by the applicable (i.e., sending) STA. In some exemplary embodiments, scheduling module 527 be used to reserve the wakeup schedule until AP 401 receives a wakeup schedule release message from the applicable STA. If the schedule is not accepted, the method is complete at block 1019.

If determined that the schedule is accepted, AP 401 in block 1013 can reserve the specified periods in the wakeup schedule for the applicable TDLS link and save the schedule. Scheduling module 425 can be used to reserve the periods specified by the wakeup schedule and save the wakeup schedule and the resultant overall TDLS schedule 340 in memory 413 as schedule 422.

Similar to block 1011, AP 401 can in block 1015 determine whether it received a wakeup schedule release message from the applicable STA. Framing module 526 can be used to determine whether it received a wakeup schedule release message in a data frame or probe request frame. If not, AP 401 returns to 1013, where the wakeup schedule remains reserved for the applicable STA and TDLS link.

Otherwise, if in block 1015 AP 401 determines that it has received a wakeup schedule release message from the applicable STA, AP 401 proceeds to block 1017, where AP 401 releases the wakeup schedule from schedule 422. Scheduling module 425 can be used to remove the released wakeup schedule from being reserved in schedule 422 and save the updated schedule 422 (excluding the released wakeup schedule) into memory 413. In some exemplary embodiments, AP 401 can also send an updated schedule 422 in a data frame or a beacon frame to other STAs. Once the wakeup schedule is released, the method is complete at 1019.

Figure 11:
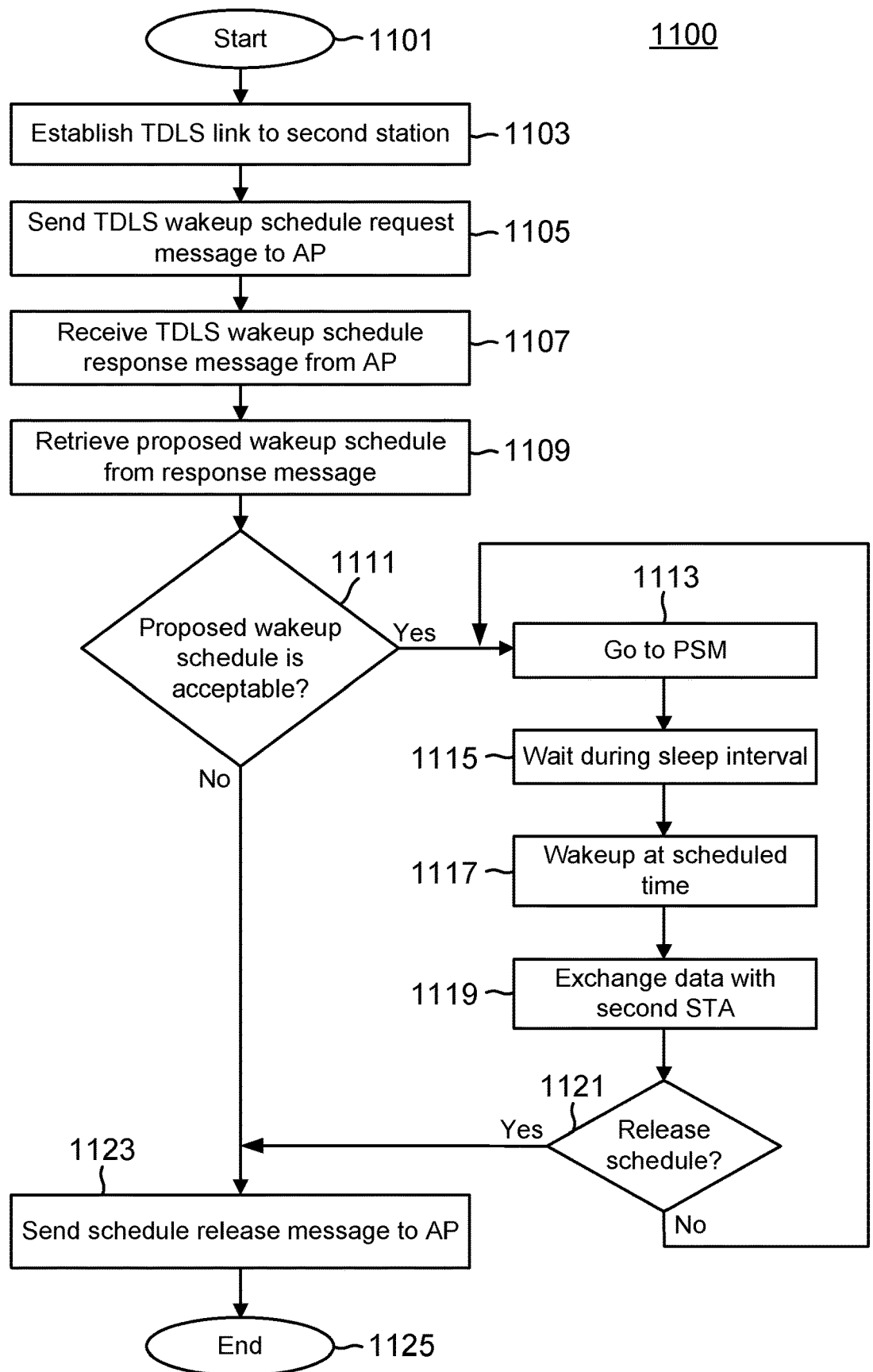
FIG. 11 is a flow chart illustrating an example of an STA direct communications management operation by an STA.

FIG. 11 is a flow chart illustrating an example of a peer-to-peer STA direct communications management operation by an STA. STA 301, 501 can perform method 1100 using framing module 526, scheduling module 527, and PSM module 528, respectively, as executed by processor 511. STA 301, 501 can perform method 1100, for example, when performing period wake/sleep cycles by entering into and returning from a power-saving mode.

Method 1100 can begin at block 1101 and proceed to block 1103, where STA 501 establishes a TDLS link with another station. In some exemplary embodiments, TDLS link module 525 can be used to establish a TDLS direct link 711 with another STA using method 900 as described above in relation to FIG. 9.

In block 1105, STA 501 can send a wakeup schedule request to AP 311, 401. In some exemplary embodiments, framing module 526 can be used to send the wakeup schedule request message 713 before the TDLS direct link 711 is established. In such cases, TDLS link module 525 can be used to establish the TDLS link using the wakeup schedule provided by AP 401. In some exemplary embodiments, the wakeup schedule request message 713 can include one or more TDLS parameters 524 from memory 513. In some exemplary embodiments, TDLS parameters 524 can include parameters related to an established TDLS link, 711 such as the frequency band of the channel and data packet size. In some exemplary embodiments, TDLS parameters 524 can also include desired parameters for the wakeup schedule, such as a desired wakeup interval and a desired wake/sleep duty cycle.

After block 1105, STA 501 in block 1107 can receive a wakeup schedule response message from AP 401. Framing module 526 can be used to receive wakeup schedule response 717 in a data frame, a probe response frame, or a beacon frame (or any other frame) from AP 401. Framing module 526 can be used to retrieve wakeup schedule response message 717 from the received frame. After receiving wakeup schedule response message 717, in 1109, STA 501 can retrieve the wakeup schedule generated by AP 401. Framing module 526 can be used to retrieve the wakeup schedule included in the wakeup schedule response message 717.

STA 501 can, in block 1111, determine whether the wakeup schedule generated and provided by AP 401 is acceptable. Scheduling module 527 can be used to determine, for example, whether the wakeup schedule adheres to TDLS link parameters 524. If STA 501 uses scheduling module 527 to determine that the wakeup schedule is not acceptable, STA 501 proceeds to 1123, where framing module 526 can be used to send a wakeup schedule release message to AP 401. Otherwise, STA 501 proceeds to block 1113.

In block 1113, STA 501 goes to sleep at the scheduled time provided by the wakeup schedule. In some exemplary embodiments, the time for STA 501 to go to sleep can be derived using scheduling module 527 and quantities provided in the wakeup schedule (e.g., sleep start time, waking interval, sleep/wake duty cycle). In some exemplary embodiments, PSM module 528 can be used to have STA 501 enter into a power-saving mode. Once STA 501 enters the PSM at block 1113, STA 501 proceeds to block 1115, where it waits for the sleep interval time. In some exemplary embodiments, scheduling module 527 can be used to derive the sleep interval using quantities provided in the wakeup schedule (e.g., sleep start time, waking interval, sleep/wake duty cycle).

Once the period for PSM has ended, STA 501 can proceed to block 1117, where STA 501 awakes at the scheduled time. In some exemplary embodiments, PSM module 528 can wake STA 501 from PSM to an active mode. Once in an active mode, STA 501 can be used to proceed to block 1119, where STA 501 can engage in data communications with the other STA using the applicable TDLS direct link 711. In some exemplary embodiments, framing module 526 can be used to receive data buffered by the other STA during the sleep period.

In block 1121, STA 501 can determine whether it wishes to send a wakeup schedule release message to AP 401. STA 501 can send a wakeup schedule release message, for example, when tearing down the TDLS link or when requesting a new wakeup schedule. If STA 501 does not wish to release the schedule, STA 501 returns to block 1113, where it waits for the scheduled time to enter into PSM. Otherwise, STA 501 proceeds to block 1123, where STA 501 sends a wakeup schedule release message to AP 401. Framing module 526 can be used to send the wakeup schedule release message in a data frame or in a probe request frame (or other frame) to AP 401. Once the wakeup schedule release message is sent to AP 401, the method is complete at block 1125.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A first station of a plurality of stations, the first station comprising:
   a processing system configured to generate a request for a wakeup schedule to support direct communications between the first station and a second station of the plurality of stations, the wakeup schedule request comprising a request for a channel frequency to support the direct communications and a time period for each of one or more wakeup intervals; and
   a transceiver coupled to the processing system and configured to:
      transmit the wakeup schedule request to a communication device associated with the plurality of stations, and
      receive a wakeup schedule for the direct communications based on the wakeup schedule request, the wakeup schedule comprising a channel in a frequency band in which the plurality of stations are associated with the communication device and the time period for each of the one or more wakeup intervals.

2. The first station of claim 1, wherein the wakeup schedule request and the wakeup schedule are exchanged as part of a frame exchange.

3. The first station of claim 2, wherein the frame exchange includes the wakeup schedule request transmitted as part of a frame and the wakeup schedule received as part of a frame.

4. The first station of claim 1, wherein the processing system is further configured to generate an active trigger message.

5. The first station of claim 4, wherein the transceiver is further configured to transmit the active trigger message.

6. The first station of claim 1, wherein the processing system is further configured to generate a schedule release message based on an unaccepted proposed wakeup schedule.

7. The first station of claim 1, wherein the transceiver is further configured to transmit the wakeup schedule request in a probe frame.

8. The first station of claim 1, wherein the frequency band is a frequency band for a Tunneled Direct Link Setup (TDLS) and the wakeup schedule further includes start and stop times based on a target beacon transmission time (TBTT).

9. A method for supporting wireless communications for a first station of a plurality of stations, the method comprising:
   generating a request for a wakeup schedule to support direct communications between the first station and a second station of the plurality of stations, the wakeup schedule request comprising a request for a channel frequency to support the direct communications and a time period for each of one or more wakeup intervals;
   transmitting the wakeup schedule request to a communication device associated with the plurality of stations, and
   receiving a wakeup schedule for the direct communications based on the wakeup schedule request, the wakeup schedule comprising a channel in a frequency band in which the plurality of stations are associated with the communication device and the time period for each of the one or more wakeup intervals.

10. The method of claim 9, wherein the wakeup schedule request and the wakeup schedule are exchanged as part of a frame exchange.

11. The method of claim 10, wherein the frame exchange includes the wakeup schedule request transmitted as part of a frame and the wakeup schedule received as part of a frame.

12. The method of claim 9, further comprising generating an active trigger message.

13. The method of claim 12, further comprising transmitting the active trigger message.

14. The method of claim 9, further comprising generating a schedule release message based on an unaccepted proposed wakeup schedule.

15. The method of claim 9, further comprising transmitting the wakeup schedule request in a probe frame.

16. The method of claim 9, wherein the frequency band is a frequency band for a Tunneled Direct Link Setup (TDLS) and the wakeup schedule further includes start and stop times based on a target beacon transmission time (TBTT).

17. A communication device for supporting wireless communications for a plurality of stations associated with the communication device, the communication device comprising:
   a transceiver configured to receive a request for a wakeup schedule to support direct communications between a first one of the stations and a second one of the stations;
   a processing system coupled to the transceiver and configured to generate the wakeup schedule for the direct communications based on the request for the wakeup schedule, the wakeup schedule comprising a channel in a frequency band in which the plurality of stations are associated with the communication device and one or more wakeup intervals, the wakeup schedule request comprising a request for a channel frequency to support the direct communications and a time period for each of the one or more wakeup intervals; and
   wherein the transceiver is further configured to transmit the wakeup schedule to at least the first one of the stations.

18. The communication device of claim 17, wherein the processing system is further configured to determine a second wakeup schedule to support direct communications between a third one of the stations and a fourth one of the stations based on the wakeup schedule for the direct communications between the first one of the stations and the second one of the stations.

19. The communication device of claim 17, wherein:
   the processing system is further configured to determine when the first one of the stations is active based on the wakeup schedule; and
   the transceiver is further configured to provide to the second one of the stations wakeup indications that the first one of the stations is active based on the determination by the processing system.

20. The communication device of claim 17, wherein the transceiver is further configured to receive the request for the wakeup schedule in a probe frame.

* * * * *